United States Patent
Porikli et al.

(10) Patent No.: US 10,322,728 B1
(45) Date of Patent: Jun. 18, 2019

(54) METHOD FOR DISTRESS AND ROAD RAGE DETECTION

(71) Applicant: Futurewei Technologies, Inc., Plano, TX (US)

(72) Inventors: Fatih Porikli, San Jose, CA (US); Yuzhu Wu, Sunnyvale, CA (US); Luis Bill, Daly City, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 15/902,729

(22) Filed: Feb. 22, 2018

(51) Int. Cl.
| | |
|---|---|
| *A61B 5/16* | (2006.01) |
| *B60W 50/14* | (2012.01) |
| *B60W 40/09* | (2012.01) |
| *G06K 9/00* | (2006.01) |
| *B60W 40/08* | (2012.01) |

(52) U.S. Cl.
CPC ........... *B60W 50/14* (2013.01); *B60W 40/09* (2013.01); *G06K 9/00845* (2013.01); *B60W 2040/0863* (2013.01); *B60W 2050/143* (2013.01); *B60W 2050/146* (2013.01); *B60W 2540/22* (2013.01); *B60W 2540/26* (2013.01)

(58) Field of Classification Search
CPC ....... A61B 5/18; G10L 25/63; G06K 9/00302
See application file for complete search history.

(56) References Cited

U.S. PATENT DOCUMENTS

| | | |
|---|---|---|
| 4,664,127 A | 5/1987 | Ikeyama |
| 2014/0112556 A1 | 4/2014 | Kalinli-Akbacak |
| 2015/0213555 A1 | 7/2015 | Barfield, Jr. et al. |
| 2017/0091872 A1 | 3/2017 | Okumura |
| 2017/0105662 A1 | 4/2017 | Silawan et al. |
| 2017/0105667 A1 | 4/2017 | Wei et al. |
| 2017/0174180 A1 | 6/2017 | Hoyos et al. |
| 2017/0188977 A1 | 7/2017 | Sato |
| 2017/0200449 A1* | 7/2017 | Penilla ................... H04L 67/12 |

(Continued)

OTHER PUBLICATIONS

"Microphone Design", [online]. Pinterest.com, Retrieved from the Internet: URL: https://www.pinterest.com/pin/366410119663309446/>, (2017), 1 pg.

(Continued)

*Primary Examiner* — Hongmin Fan
(74) *Attorney, Agent, or Firm* — Schwegman Lundberg & Woessner, P.A.

(57) ABSTRACT

A system for determining distress of a driver of a vehicle is provided, comprising a plurality of sensors, including interior vehicle image sensors, an interior vehicle audio sensor, vehicle data sensors, and Global Positioning System (GPS) data sensors. The system also includes one or more processors configured to receive inputs from the plurality of sensors, and process the received inputs to obtain a driver heat change estimate, a driver expression estimate, a driver gesture estimate, an on-board diagnostics (OBD) estimate, and a GPS estimate. The one or more processors are further configured to store the estimates in a memory, use the stored estimates to generate deviation scores for each of the estimates, execute a machine learning algorithm to classify driver behavior as normal or impaired based on the deviation scores, and generate a warning based on the classification indicating impaired driver behavior.

19 Claims, 17 Drawing Sheets

(56) References Cited

U.S. PATENT DOCUMENTS

| | | | |
|---|---|---|---|
| 2017/0215811 A1 | 8/2017 | Newberry | |
| 2017/0290552 A1 | 10/2017 | Naruse | |
| 2018/0001899 A1* | 1/2018 | Shenoy | B60W 40/09 |

OTHER PUBLICATIONS

Abouelenien, M., et al., "Human Acute Stress Detection via Integration of Physiological Signals and Thermal Imaging", Proceedings of the 9th ACM Conference on Pervasive Technologies Related to Assistive Environments (PETRA 2016), (2016), 8 pgs.

Aigrain, J., et al., "Multimodal stress detection from multiple assessments", EEE Transactions on Affective Computing, vol. PP, No. 99, (2016), 1-16.

Anzengruber, B., ""FaceLight"—Potentials and Drawbacks of Thermal Imaging to Infer Driver Stress", Proceedings of the 4th International Conference on Automotive User Interfaces and Interactive Vehicular Applications (AutomotiveUI'12), (2012), 209-216.

Baltrušaitis, T., et al., "Multimodal Machine Learning: A Survey and Taxonomy", [online]. arXiv:1705.09406v1 [cs.LG] May 26, 2017, (May 26, 2017), 1-20.

Boccanfuso, L., "A thermal emotion classifier for improved human-robot interaction", 2016 25th IEEE International Symposium on Robot and Human Interactive Communication (RO-MAN), Aug. 26-31, 2016, Columbia University, New York, NY, (2016), 718-723.

Cao, Z., et al., "Realtime Multi-Person 2D Pose Estimation using Part Affinity Fields *", 2017 IEEE Conference on Computer Vision and Pattern Recognition, (2017), 1302-1310.

De Silva, L. C., et al., "Facial Emotion Recognition Using Multimodal Information", International Conference on Information, Communications and Signal Processing, ICICS '97, Singapore, Sep. 9-12, 1997, (1997), 397-401.

Gao, H., et al., "Detecting emotional stress from facial expressions for driving safety", 2014 IEEE International Conference on Image Processing (ICIP), Paris, (2014), 5961-5965.

Humphreys, K., et al., "A CMOS camera-based system for clinical photoplethysmographic applications", Proc. SPIE 5823, Opto-Ireland 2005: Imaging and Vision, (Jun. 1, 2005), 88-95.

Jin, L., et al., "Driver Cognitive Distraction Detection Using Driving Performance Measures", Discrete Dynamics in Nature and Society, vol. 2012, Article ID 432634, (2012), 1-12.

Latif, M. H., et al., "Emotion Detection From Thermal Facial Imprint Based on GLCM Features", ARPN Journal of Engineering and Applied Sciences, 11(1), (Jan. 2016), 345-350.

Lee, B.-G., et al., "Real-time physiological and vision monitoring of vehicle driver for non-intrusive drowsiness detection", IET Communications, 5(17), (2011), 2461-2469.

Liang, Y., et al., "Real-Time Detection of Driver Cognitive Distraction Using Support Vector Machines", IEEE Transactions on Intelligent Transportation Systems, 8(2), (Jun. 2007), 340-350.

Ma, C.-Y., et al., "TS-LSTM and Temporal-Inception: Exploiting Spatiotemporal Dynamics for Activity Recognition", arXiv:1703.10667v1 [cs.CV] Mar. 30, 2017, (2017), 1-16.

Ma, M., et al., "Going Deeper into First-Person Activity Recognition", 2016 IEEE Conference on Computer Vision and Pattern Recognition, (2016), 1894-1903.

Noldus, "FaceReader 7", [online]. Retrieved from the Internet: <URL: http://www.noldus.com/facereader/remote-photoplethysmography-facereader>, (Jun. 24, 2017), 4 pgs.

Nunnally, D., "Road rage is on the rise, but there are things you can do to help avoid it,", [online]. The Sacramento Bee. Retrieved from the Internet: <URL: http://www.sacbee.com/latest-news/article158037944,html>, (Jun. 24, 2017), 5 pgs.

Ooi, J. S. K., et al., "Driver Emotion Recognition Framework Based on Electrodermal Activity Measurements During Simulated Driving Conditions", 2016 IEEE EMBS Conference on Biomedical Engineering and Sciences (IECBES), Kuala Lumpur, (2016), 365-369.

Simon, T., et al., "Hand Keypoint Detection in Single Images using Multiview Bootstrapping", 2017 IEEE Conference on Computer Vision and Pattern Recognition (CVPR), (2017), 4645-4653.

Soleymani, M., et al., "Analysis of EEG Signals and Facial Expressions fo Continuous Emotion Detection", IEEE Transactions on Affective Computing, 7(1), (Jan.-Mar. 2016).

Van Gastel, M., et al., "Motion Robust Remote-PPG in Infrared", IEEE Transactions on Biomedical Engineering, 625), (May 2015), 1425-1433.

Walter, S., et al., "Multimodal Emotion Classification in Naturalistic User Behavior", In: Jacko, J. A. (eds), Human-Computer Interaction, Towards Mobile and Intelligent Interaction Environments. HCI 2011. Lecture Notes in Computer Science, vol. 6763. Springer, Berlin, , Heidelberg, (2011), 603-611.

Wang, W., et al., "A Novel Algorithm for Remote Photoplethysmography: Spatial Subspace Rotation", IEEE Transactions on Biomedical Engineering, 63(9), (Sep. 2016), 1974-1984.

Wei, S.-E., et al., "Convolutional Pose Machines", 2016 IEEE Conference on Computer Vision and Pattern Recognition (CVPR), (2016), 4724-4732.

Wu, B. F., et al., "A Motion Robust Remote-PPG Approach to Driver's Health State Monitoring", In: Chen, C.S., Lu J., Ma KK. (eds), Computer Vision—ACCV 2016 Workshops. ACCV 2016. Lecture Notes in Computer Science, vol. 10116, (2017), 463-476.

Wu, H.-Y., et al., "Eulerian Video Magnification for Revealing Subtle Changes in the World", ACM Transactions on Graphics 31(4), (2012), 1-8.

You, C., et al., "CarSafe: a driver safety app that detects dangerous driving behavior using dual-cameras on smartphones", Proceedings of the 2012 ACM Conference on Ubiquitous Computing, (2012), 671-672.

* cited by examiner

METHOD FOR DISTRESS AND ROAD RAGE DETECTION

TECHNICAL FIELD

The present disclosure relates to automated systems for vehicle safety, and in particular to systems and methods for detection of driver and passenger distress and road rage.

BACKGROUND

Automated systems for vehicle safety have been adapted for collision avoidance. Previous systems for detection of road rage by a driver of a vehicle have focused on invasive systems such as blood pressure and heart rate monitoring, and noninvasive systems that use mainly images and vocal recording. In addition, previous invasive systems use extensive sensor installation and complicated data collection, while noninvasive systems rely on interpretation of subtle cues, which may vary among individual drivers.

SUMMARY

Methods, apparatus, and systems are provided for detection of driver and passenger distress and road rage. Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a method for determining distress of a driver of a vehicle is provided. The method comprises receiving inputs from a plurality of sensors by one or more processors, the sensors including interior vehicle image sensors, an interior vehicle audio sensor, vehicle data sensors, and Global Positioning System (GPS) data sensors, and processing the received inputs to obtain a driver heat change estimate, a driver expression estimate, a driver gesture estimate, an on-board diagnostics (OBD) estimate, and a GPS estimate. The estimates are stored in a memory, and the stored estimates are used to generate deviation scores for each of the driver heat change estimate, the driver expression estimate, the driver gesture estimate, the OBD estimate, and the GPS estimate. A machine learning algorithm is executed by the one or more processors to classify driver behavior as normal or impaired based on the deviation scores, and to generate a warning based on the classification indicating impaired driver behavior.

Optionally, in any of the preceding aspects, generating the deviation score for the driver or passenger heat change estimate includes: generating a normal driving model offline using normal driving thermal images of the driver or a passenger; comparing the normal driving model with real-time thermal image data of the driver or the passenger to obtain a comparison result; and applying a probability density function (PDF) to the comparison result to obtain the deviation score for the driver or passenger heat change estimate.

Optionally, in any of the preceding aspects, generating the deviation score for the driver or passenger expression estimate includes: using detection-tracking-validation (DTV) to localize frontal face images of the driver or a passenger; constructing a face stream frame from a partitioned face region of the frontal face images; applying a fully convolutional network (FCN) to the face stream frame using an encoder, including using multiple convolutional, pooling, batch normalization, and rectified linear unit (ReLU) layers; reshaping a feature map of a last layer of the encoder into vector form to obtain an output, and applying the output to a recurrent neural network (RNN) to obtain a normal driving expression model using a Gaussian mixture model (GMM); and comparing a real-time driver or passenger expression with the normal driving expression model to calculate the deviation score for the driver or passenger expression estimate.

Optionally, in any of the preceding aspects, generating the deviation score for the driver or passenger gesture estimate includes: detecting driver or passenger gestures to obtain an image of a hands region of the driver or passenger; constructing a two-layer hand stream from the image and normalizing the two-layer hand stream for size adjustment; applying a fully convolutional network (FCN) to the two-layer hand stream using an encoder, including using multiple convolutional, pooling, batch normalization, and rectified linear unit (ReLU) layers; reshaping a feature map of a last layer of the encoder into vector form to obtain an output, and applying the output to a recurrent neural network (RNN) to obtain a normal driving gesture model using a Gaussian mixture model (GMM); and comparing a real-time driver or passenger gesture with the normal driving or passenger gesture model to calculate the deviation score for the driver or passenger gesture estimate.

Optionally, in any of the preceding aspects, generating the deviation score for the OBD estimate includes: collecting normal driving data from OBD related to two or more of vehicle speed, steering wheel angle, steering wheel angle error, time to lane crossing, and time to collision; using the normal driving data to generate a normal driving model for each of the two or more of vehicle speed, steering wheel angle, steering wheel angle error, time to lane crossing, and time to collision; and comparing real-time data to the normal driving model for each of the two or more of vehicle speed, steering wheel angle, steering wheel angle error, time to lane crossing, and time to collision to generate a deviation score for each of the two or more of vehicle speed, steering wheel angle, steering wheel angle error, time to lane crossing, and time to collision.

Optionally, in any of the preceding aspects, the warning includes a visual alert. Optionally, in any of the preceding aspects, the warning includes an audio output. Optionally, in any of the preceding aspects, the warning includes a suggested corrective driver action using a display. Optionally, in any of the preceding aspects, using the processor to execute the machine learning algorithm to classify the driver behavior as normal or impaired includes using a Gaussian mixture model (GMM). Optionally, in any of the preceding aspects, expectation maximization is used to estimate model parameters of the GMM. Optionally, in any of the preceding aspects, the processor is configured to generate a normal driving model offline for comparison to real-time driving data.

According to another aspect of the present disclosure, a system for determining distress of a driver of a vehicle is provided. The system comprises a plurality of sensors, including interior vehicle image sensors, an interior vehicle audio sensor, vehicle data sensors, and Global Positioning System (GPS) data sensors, and a processor in communication with the plurality of sensors. The processor is configured to: receive inputs from the plurality of sensors, process the received inputs to obtain a driver or passenger heat change estimate, a driver or passenger expression estimate, a driver or passenger gesture estimate, an on-board diagnostics (OBD) estimate, and a GPS estimate, and store the estimates in a memory. The stored estimates are to generate deviation scores for each of the driver or passenger heat change estimate, the driver or passenger expression estimate, the driver gesture estimate, the OBD estimate, and the GPS estimate. A machine learning algorithm is executed to classify driver behavior as normal or impaired based on the deviation scores, and a warning is generated based on the classification indicating impaired driver or passenger behavior.

Optionally, in any of the preceding aspects, the plurality of sensors further includes exterior-facing sensors of the vehicle. Optionally, in any of the preceding aspects, the processor is further configured to receive a traffic information input, including at least one of a speed limit and a lane direction. Optionally, in any of the preceding aspects, the warning includes a suggested corrective driver action using a display.

According to another aspect of the present disclosure, a non-transitory computer-readable medium is provided, the medium storing computer instructions to determine distress of a driver of a vehicle and provide a warning, that when executed by one or more processors, cause the one or more processors to perform steps of: receiving inputs from a plurality of sensors, including interior vehicle image sensors, an interior vehicle audio sensor, vehicle data sensors, and Global Positioning System (GPS) data sensors; processing the received inputs to obtain a driver or passenger heat change estimate, a driver or passenger expression estimate, a driver gesture estimate, an on-board diagnostics (OBD) estimate, and a GPS estimate; storing the estimates in a memory; using the stored estimates to generate deviation scores for each of the driver or passenger heat change estimate, the driver or passenger expression estimate, the driver gesture estimate, the OBD estimate, and the GPS estimate; executing a machine learning algorithm to classify driver behavior as normal or impaired based on the deviation scores; and generating the warning based on the classification indicating impaired driver or passenger behavior.

Optionally, in any of the preceding aspects, generating the deviation score for the driver or passenger heat change estimate includes: generating a normal driving model offline using normal driving thermal images of the driver or a passenger; comparing the normal driving model with real-time thermal image data of the driver or the passenger to obtain a comparison result; and applying a probability density function (PDF) to the comparison result to obtain the deviation score for the driver or passenger heat change estimate.

Optionally, in any of the preceding aspects, generating the deviation score for the driver or passenger expression estimate includes: using detection-tracking-validation (DTV) to localize frontal face images of the driver or a passenger; constructing a face stream frame from a partitioned face region of the frontal face images; applying a fully convolutional network (FCN) to the face stream frame using an encoder, including using multiple convolutional, pooling, batch normalization, and rectified linear unit (ReLU) layers; reshaping a feature map of a last layer of the encoder into vector form to obtain an output, and applying the output to a recurrent neural network (RNN) to obtain a normal driving expression model using a Gaussian mixture model (GMM); and comparing a real-time driver or passenger expression with the normal driving expression model to calculate the deviation score for the driver or passenger expression estimate.

Optionally, in any of the preceding aspects, generating the deviation score for the driver or passenger gesture estimate includes: detecting driver gestures to obtain an image of a hands region of the driver or passenger; constructing a two-layer hand stream from the image and normalizing the two-layer hand stream for size adjustment; applying a fully convolutional network (FCN) to the two-layer hand stream using an encoder, including using multiple convolutional, pooling, batch normalization, and rectified linear unit (ReLU) layers; reshaping a feature map of a last layer of the encoder into vector form to obtain an output, and applying the output to a recurrent neural network (RNN) to obtain a normal driving or passenger gesture model using a Gaussian mixture model (GMM); and comparing a real-time driver or passenger gesture with the normal driving or passenger gesture model to calculate the deviation score for the driver or passenger gesture estimate.

Optionally, in any of the preceding aspects, generating the deviation score for the OBD estimate includes: collecting normal driving data from OBD related to two or more of vehicle speed, steering wheel angle, steering wheel angle error, time to lane crossing, and time to collision; using the normal driving data to generate a normal driving model for each of the two or more of vehicle speed, steering wheel angle, steering wheel angle error, time to lane crossing, and time to collision; and comparing real-time data to the normal driving model for each of the two or more of vehicle speed, steering wheel angle, steering wheel angle error, time to lane crossing, and time to collision to generate a deviation score for each of the two or more of vehicle speed, steering wheel angle, steering wheel angle error, time to lane crossing, and time to collision.

This Summary is an overview of some of the teachings of the present application and not intended to be an exclusive or exhaustive treatment of the present subject matter. Further details about the present subject matter are found in the detailed description and appended claims. The scope of the present inventive subject matter is defined by the appended claims and their legal equivalents.

DETAILED DESCRIPTION

Figure 1A:
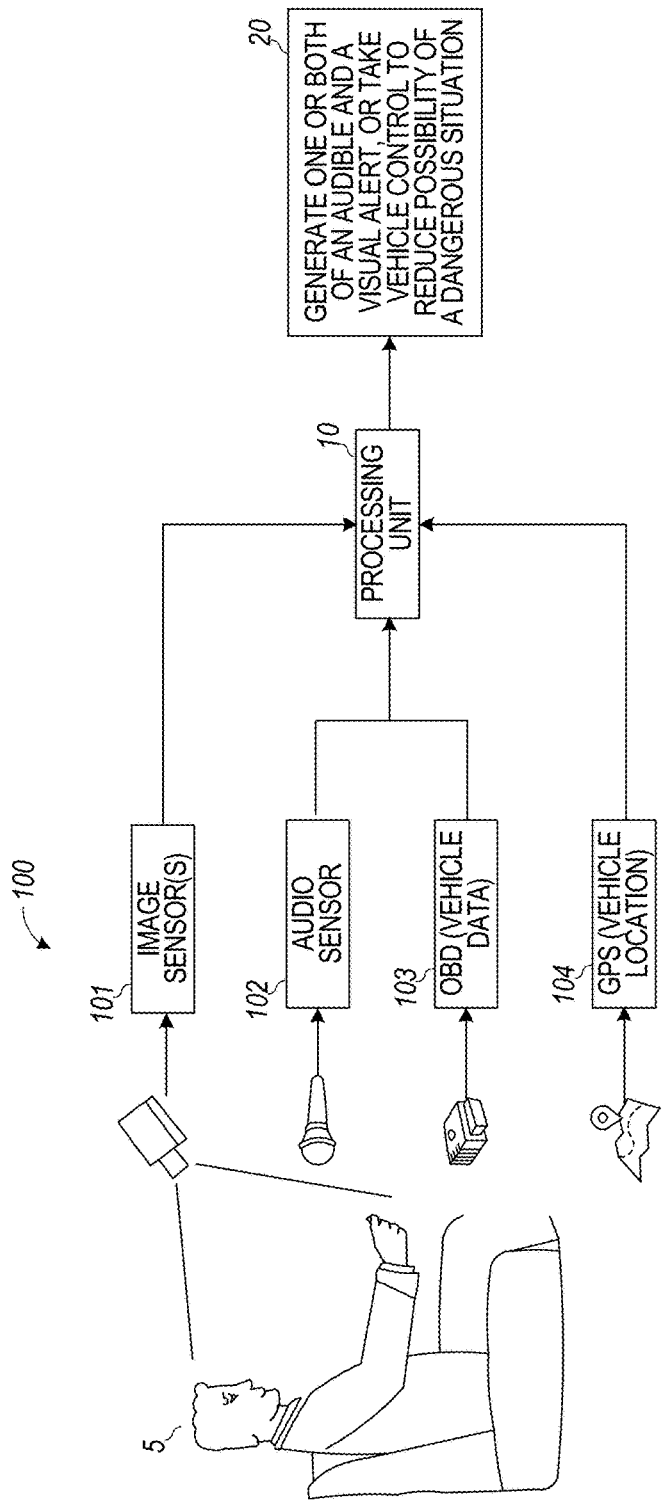
FIGS. 1A-1B are block diagrams illustrating systems for detection of driver and passenger distress, according to various embodiments.

In the following description, reference is made to the accompanying drawings that form a part hereof, and in which are shown by way of illustration specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

When drivers are angry or distressed, they become more aggressive and less attentive, which can lead to accidents. Embodiments of the present subject matter monitor distress and road rage in real time as part of a driver assistance system. The recognition of distress and road rage typically relies on interpretation of very subtle cues, which may vary among individuals. Therefore, embodiments of the present subject matter monitor a plurality of modalities (such as facial expressions, hand gestures, vehicle speed, etc.) in order to create a robust system, which can be used to detect changes in driver temperament.

Road rage can be classified into four stages: in stage 1, when a driver is annoyed by somebody, they usually start making non-threatening gestures or facial expressions to show annoyance; in stage 2, after showing their dissatisfaction, angry drivers can escalate the situation by honking, flashing lights, braking maliciously, tailgating, and blocking vehicles; in stage 3, aggressive drivers might curse, yell, and threaten another driver; in stage 4, a worst case is that some drivers might fire a gun, hit a vehicle with objects, chase a vehicle, or run a vehicle off the road.

The present subject matter provides a distress and road rage monitoring system, which can monitor a driver or passenger to detect levels of distress and road rage and provide a notification if distress or road rage is detected. The system incorporates, but is not limited to, thermal imaging, speech, and visual information together, as well as other modalities, such as driving performance and hand gestures, in various embodiments. The inputs to a processing unit can be information originating from audio sensors, image sensors (e.g., near-infrared reflectance (NIR) cameras or thermal cameras), and overall vehicle data. The system can then assist the driver or passenger to reduce the possibility of an incident. By using a multimodal approach, the present system can obtain important information that otherwise cannot be obtained when relying on just a single source of information. Each modality can provide information that may not be found in a different modality (e.g., image information from an image sensor vs. sound information from a sound transducer).

In addition, embodiments of the present subject matter use neural networks, reinforcement learning, and other machine learning techniques in order for the system to learn which features about the driver and the vehicle can be useful when detecting road rage and stress.

The present disclosure relates to automated systems for vehicle safety, and in particular to systems and methods for detection of driver and passenger distress and road rage. While examples are provided for driver detection, the systems can also be used for passenger detection, in various embodiments. In one embodiment, a system for determining distress of a driver of a vehicle is provided, comprising a plurality of sensors, including, but not limited to, interior vehicle image sensors, an interior vehicle audio sensor, vehicle data sensors, and Global Positioning System (GPS) data sensors. The system also includes a processor configured to receive inputs from the plurality of sensors, and process the received inputs to obtain a driver or passenger heat change estimate, a driver or passenger expression estimate, a driver gesture estimate, an on-board diagnostics (OBD) estimate, and a GPS estimate. The processor is further configured to store the estimates in a memory, use the stored estimates to generate deviation scores for each of the estimates, execute a machine learning algorithm to classify driver behavior as normal or impaired based on the deviation scores, and generate a warning if the classification indicates impaired driver behavior.

The functions or algorithms described herein may be implemented in software in one embodiment. The software may consist of computer-executable instructions stored on computer-readable media or a computer-readable storage device such as one or more non-transitory memories or other types of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, application-specific integrated circuit (ASIC), microprocessor, or other type of processor operating on a computer system, such as a personal computer, server, or other computer system, turning such a computer system into a specifically programmed machine.

According to one aspect of the present disclosure, a method for determining distress of a driver of a vehicle is provided. The method comprises receiving inputs from a plurality of sensors, including interior vehicle image sensors, an interior vehicle audio sensor, vehicle data sensors, and Global Positioning System (GPS) data sensors, and processing the received inputs to obtain a driver or passenger heat change estimate, a driver or passenger expression estimate, a driver or passenger gesture estimate, an on-board diagnostics (OBD) estimate, and a GPS estimate. The estimates are stored in a memory, and the stored estimates are used to generate deviation scores for each of the driver or passenger heat change estimate, the driver or passenger expression estimate, the driver or passenger gesture estimate, the OBD estimate, and the GPS estimate. A machine learning algorithm is executed to classify driver behavior as normal or impaired based on the deviation scores, and to generate a warning if the classification indicates impaired driver or passenger behavior.

In various embodiments, a computer-implemented system determines driving information of the driver (and passengers if available), the driving information being based on sensor information collected by image sensors, location sensors, sound sensors, and vehicle sensors, which can then be used in order to understand the driver's and passengers' states, so that the system can further determine if distress or road rage is present in the driver's state. The system uses machine learning and pre-trained models in order to learn how to predict distress and road rage, in various embodiments, and stores this model in memory. Machine learning techniques, such as reinforcement learning, allow the system to adapt to the driver's distress/road rage driving performance, and non-distress/road rage driving performance, in various embodiments.

Systems and methods of the present subject matter generate a prediction model of the driver's distress and road rage level. Various embodiments of a method include identifying the driver and passengers inside the vehicle, identifying the hands and faces of the driver and passengers, tracking the hands and faces, and using this information in order to detect facial expressions, gestures, thermal states, and activities that are indicators of distress. The method further includes identifying the state of the environment, such as traffic conditions, objects near the vehicle, sounds around the vehicle (such as other vehicles honking), road conditions, and the speed limit, in various embodiments. In various embodiments, the method also includes obtaining driving performance data, such as acceleration, speed, steering angle, and other embedded sensor data. Other inputs can be used without departing from the scope of the present subject matter. The method includes fusing the aforementioned indicators, states, and data to determine if the driver is enraged or distressed, in various embodiments.

Various embodiments of the present system use a multi-modal approach (e.g., multiple data streams, such as images, audio, vehicle data, etc.), such as described with respect to FIG. 4 below, where each modality can be used to detect features that help the system understand the driver's distress and road rage levels. In various embodiments, the system can adapt and learn ways different drivers may display rage and distress expressions, and determine driver preferences for how warning and driving assistance are to be provided. For example, some drivers prefer frequent and repetitive warnings, which will provide assistance until the driver calms down, while other drivers prefer short warnings, because these drivers may be distracted by the alarms and warnings. In various embodiments, driver assistance may include reducing or limiting the speed of the vehicle, applying the brakes of the vehicle, or vibrating the steering wheel. Other types of driver assistance can be used without departing from the scope of the present subject matter. Various embodiments of the present system also accept driver feedback using reinforcement learning, which allows the system to continuously adapt to the driver. Advantages of the technical improvements of the present subject matter include that the present systems provide the desired warnings without requiring invasive sensing, such as blood pressure cuffs or other special equipment.

Figure 1B:
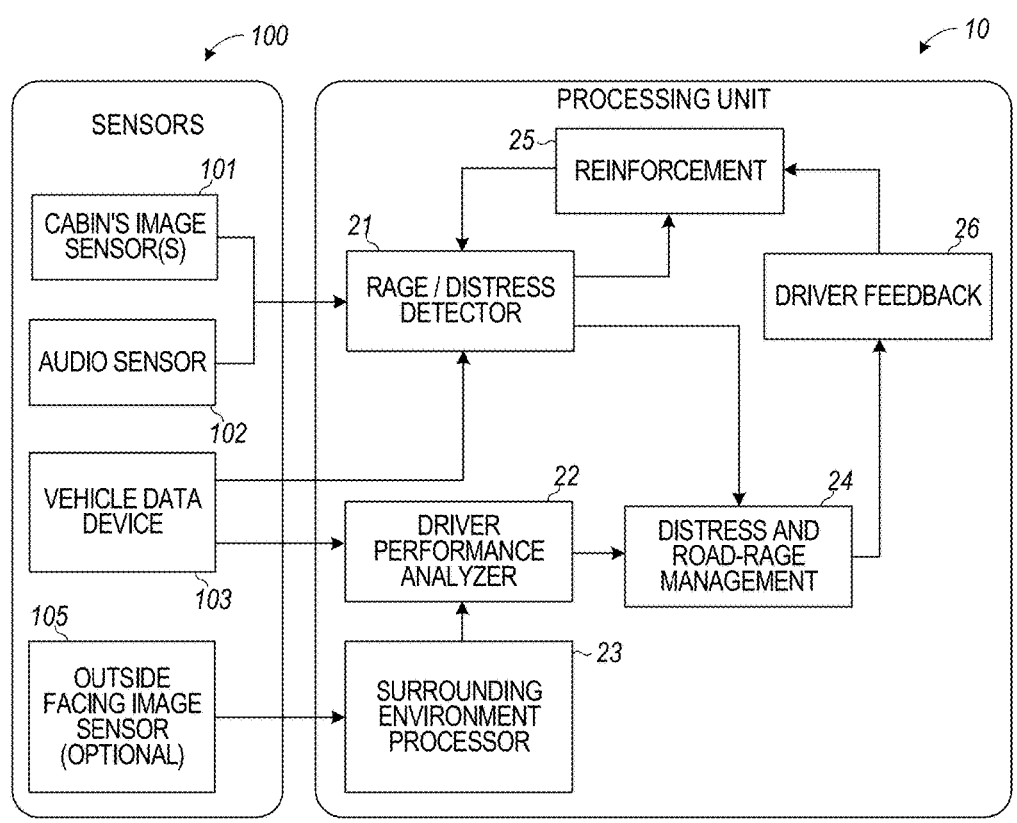

FIGS. 1A-1B are block diagrams illustrating systems for detection of driver and passenger distress, according to various embodiments. The depicted embodiment includes a plurality of sensors 100 including at least one image sensor 101, at least one audio sensor 102, an OBD access device 103 for obtaining vehicle data, and a GPS input 104 for obtaining vehicle location. Various embodiments include a processing unit 10, and an output (such as generation of an audible or visual alert or taking control of the vehicle) 20 generated by the processing unit 10 based on the condition of a driver 5. Various embodiments also include an outside-facing image sensor 105 that records information about the environment outside the vehicle, as shown in FIG. 1B. In various embodiments, the processing unit 10 can include any platform that has capabilities to run neural processing computations, such as existing vehicle hardware, a mobile phone, or a dedicated device that is connected to vehicle OBD and GPS. The processing unit 10 can include a rage and distress detector 21, a driver performance analyzer 22, a surrounding environment processor 23, a distress and road rage management processor 24, a module for reinforcement 25 and an input for driver feedback 26 in various embodiments. The rage and distress detector 21 uses statistical models that allow the system to use statistical classification to determine distress and road rage levels. Since there are different levels of distress and road rage, the system can use a reference point for each of the modalities that are used as input. For example, the system uses a statistical distribution model that determines how far from normal or from the average the currently detected distress and road rage are. The system can learn offline or in real time a normal driving baseline for a particular driver, and depending on how far the driving performance has deviated from the normal driving performance, the system determines if the driver's distress and road rage levels are acceptable. Some indicators of normal driving can include, but are not limited to: driving at or under the speed limit based on GPS information; word usage that does not include offensive language, as well as normal sound levels of the voice; and hand gestures that may not be included in the category of offensive hand gestures. In various embodiments, the system adapts the model in real time in order to accommodate a driver's normal driving performance, including learning the regular driving speed, the regular body parts heat signatures, and the normal noise levels inside the cabin. Then, using reinforcement learning techniques, the system readjusts the parameters and models that are currently in use to determine if the levels of distress and road rage are within a normal range of driving performance for the particular driver.

FIG. 1B illustrates a sample data flow and sample data analysis schematics using multiple modalities. The system automatically detects and tracks the driver's face and eyes using image-sensor 101 (e.g., thermal and NIR) streams as input, in an embodiment. Using the face and eyes, the system can recognize the heat change and facial expressions of the driver. The system detects the driver's hands using the image sensor stream, in various embodiments. Using the hand regions as spatial anchors, the system recognizes the driver's gestures. The system can also use the audio stream acquired from a microphone inside the vehicle as an input to analyze the driver's voice and sounds from inside the vehicle, in an embodiment. The rage and distress detector 21 analyses the inputs to understand the driver's driving performance.

The audio sensor 102 in FIGS. 1A-1B can be an in-vehicle microphone or a smartphone microphone, in various embodiments. The audio sensor 102 can be used to record various audio features, including, but not limited to, speech recognition, as there are certain key words and tone intensities that indicate that the driver is distressed; speech volume (whether the driver is speaking or there are passengers' voices in the audio signal); or whether the driver is hitting/banging a part of the vehicle's cabin with their hands, during a moment of distress and rage. Other factors may be part of the environment outside the vehicle, such as other vehicles honking or other drivers shouting at the driver. Sounds outside the vehicle may also be factors that can increase distress on the driver, and this distress may lead to road rage. Using machine learning, the system may learn what specific and repetitive sounds may lead to increases in distress and road rage levels for a driver.

The OBD access device or vehicle data device 103 in FIGS. 1A-1B receives, processes, and stores sensor and driving information, and provides such sensor and driving information to the rage and distress detector 21 and the driver performance analyzer 22. The OBD access device 103 can be manufactured by the vehicle's original equipment manufacturer (OEM), or can be an aftermarket device. The OBD access device 103 can have access to a controller area network (CAN) bus, for instance, through an OBD logger, and can access sensors, such as an accelerometer, a gyroscope, a GPS sensor, and other types of sensors, and further can communicate with user devices, such as smartphones, using a wired or wireless connection, in various embodiments.

The driver performance analyzer 22 is used to evaluate driving performance impairment under distress and road rage. When the driver is distressed or enraged, he/she typically reacts more erratically (and at times with a slower reaction time). A two-level model of performance impairment may be used in this system. In the first level, which represents relatively minor degradation, drivers are generally able to control the vehicle accurately, and there is no significant reduction of driving performance. In the second level, as impairment becomes more severe, drivers become less able to maintain the same driving performance.

The surrounding environment processor 23 in FIG. 1B can use the video frames coming from the outside-facing image sensor 105, as well as the GPS data from the GPS input 104, to detect road conditions such as potholes, lane markers, and road curvature, and surrounding objects such as other vehicles, pedestrians, motorcycles, bicycles, and traffic signs or lights. Other road conditions and surrounding objects can be detected without departing from the scope of the present subject matter. The driver feedback 26 can be used with reinforcement 25 learning algorithms by updating the distress/road rage detector models using the buffered streams. In various embodiments, the distress and road rage management processor 24 generates warnings and suggests corrective actions for the driver.

Figure 2:
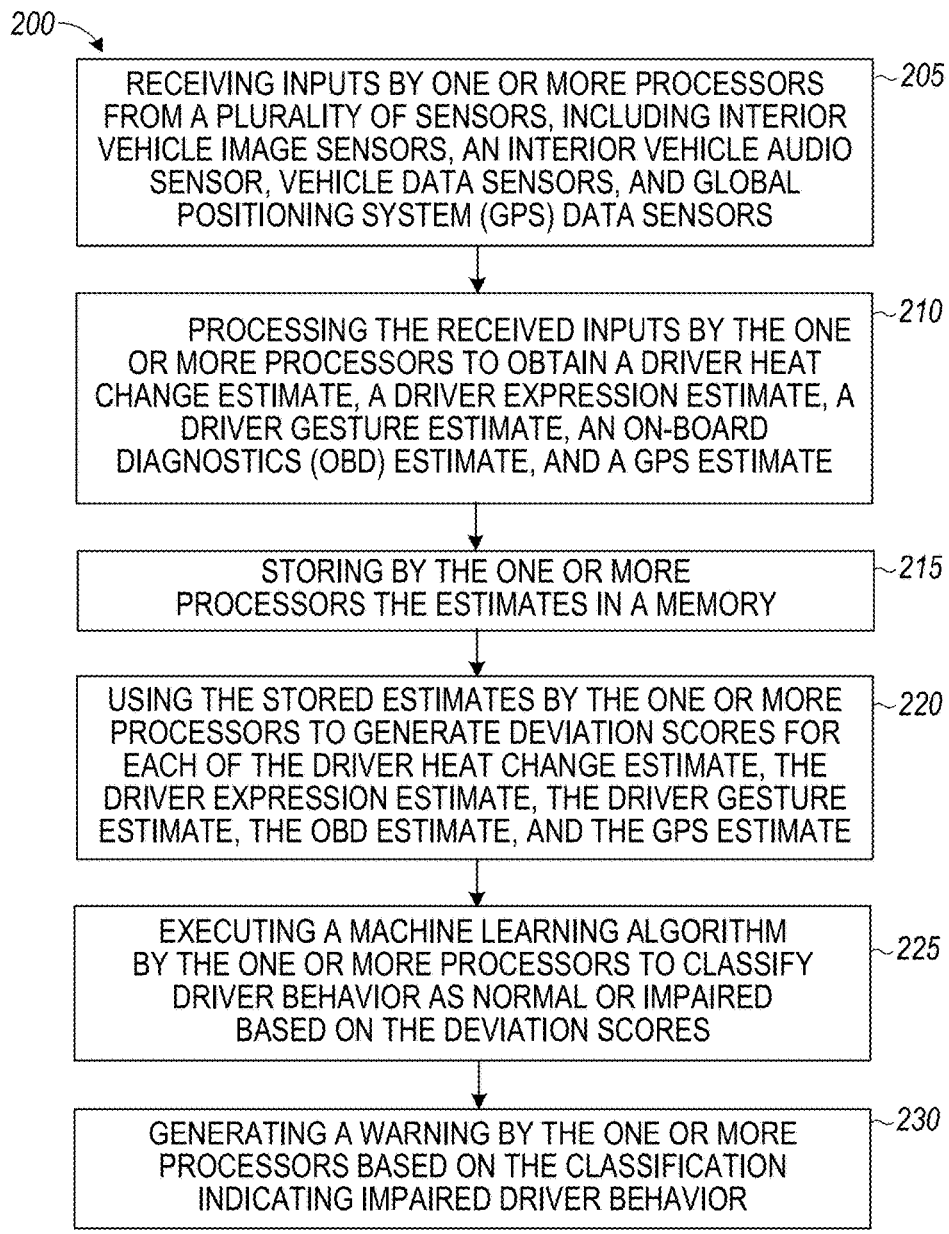
FIG. 2 is a flow diagram illustrating a method for detection of driver and passenger distress, according to various embodiments.

FIG. 2 is a flow diagram illustrating a method 200 for detection of driver and passenger distress, according to various embodiments. At 205, a processor is used to receive inputs from a plurality of sensors, including interior vehicle image sensors, an interior vehicle audio sensor, vehicle data sensors, and GPS data sensors. The processor is used to process the received inputs to obtain a driver or passenger heat change estimate, a driver or passenger expression estimate, a driver gesture estimate, an OBD estimate, and a GPS estimate, at 210. At 215, the processor is used to store the estimates in a memory, and at 220, the processor and the stored estimates are used to generate deviation scores for each of the driver or passenger heat change estimate, the driver or passenger expression estimate, the driver gesture estimate, the OBD estimate, and the GPS estimate. At 225, the processor is used to execute a machine learning algorithm to classify driver behavior as normal or impaired based on the deviation scores, and at 230, the processor is used to generate a warning if the classification indicates impaired driver behavior.

Figure 3:
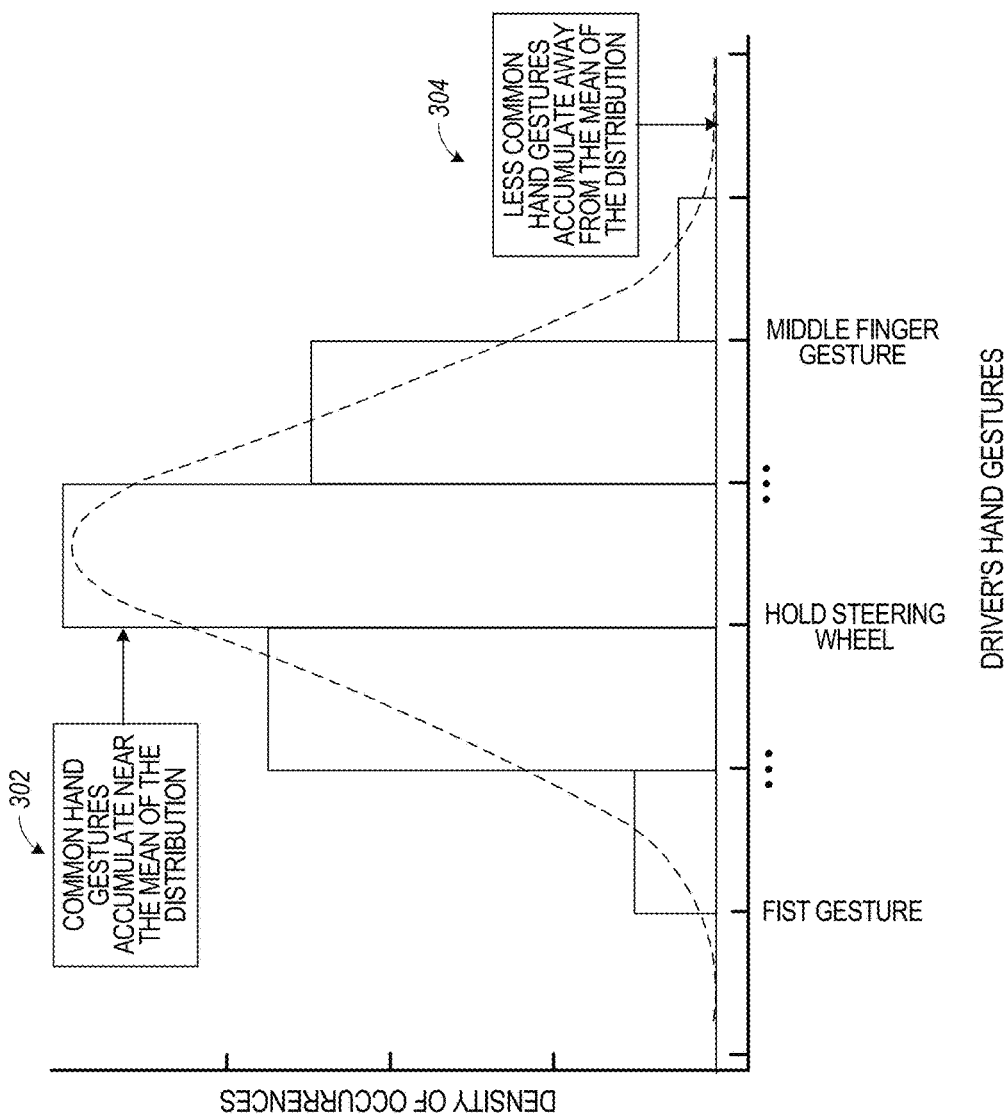
FIG. 3 is a graph illustrating density of occurrences of driver hand gestures, according to various embodiments.

FIG. 3 is a graph illustrating density of occurrences of driver hand gestures, according to various embodiments. The graph depicts a sample of a normal distribution model of normal driving performance which shows how normal driving gestures 302 accumulate towards the middle of the distribution (more common or repetitive), and how gestures that are not that common 304 tend to accumulate on the sides of the distribution (less repetitive or less common). Common hand gestures include holding the steering wheel, while less common hand gestures include a fist gesture or a middle finger gesture by the driver, as shown in the depicted embodiment.

Figure 4:
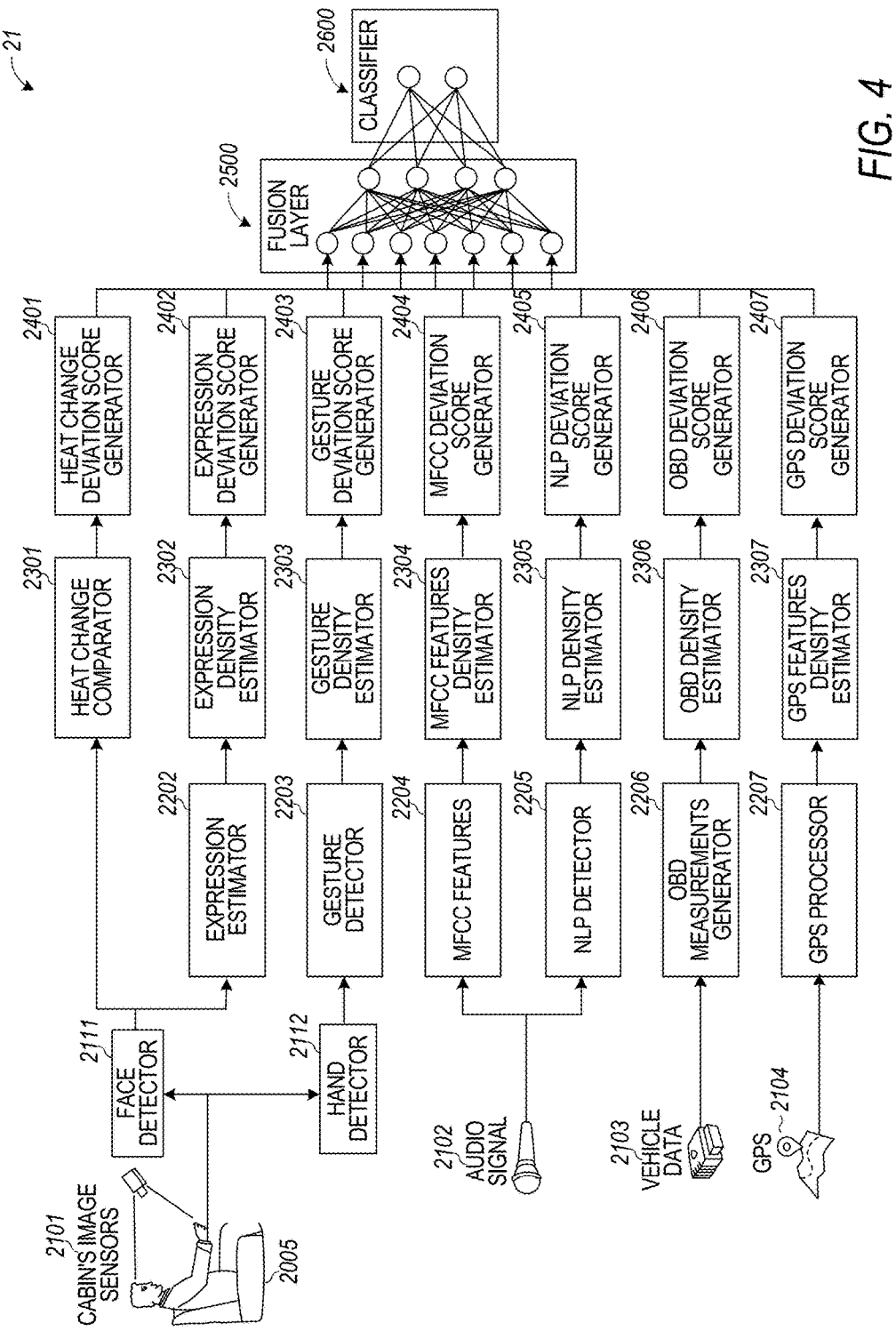
FIG. 4 is a block diagram illustrating a system for detection of driver and passenger distress, according to various embodiments.

FIG. 4 is a block diagram illustrating a system for detection of driver and passenger distress, according to various embodiments. The depicted embodiment shows details of the rage and distress detector 21 from FIG. 1A, as it processes data through several streams. In various embodiments, the system receives inputs from the vehicle's cabin image sensors 2101 including images of the driver 2005, inputs from audio sensors 2102, inputs from vehicle data 2103, and inputs from a GPS sensor 2104. The cabin image sensor 2101 input is processed by a face detector 2111, heat change comparator 2301, expression estimator 2202 and expression density estimator 2302, and further processed by a hand detector 2112, gesture detector 2203 and gesture density estimator 2303, in various embodiments. The audio sensor 2102 input is processed for mel-frequency cepstral coefficients (MFCC) features 2204, MFCC feature density estimator 2304, and by natural language processing (NLP) detector 2205 and NLP density estimator 2305, in various embodiments. The vehicle data 2103 input is processed by OBD measurement generator 2206 and OBD density estimator 2306, and the GPS sensor 2104 input is processed 2207 by GPS features density estimator 2307. For each aspect, a normal driving model will be pre-trained using a probabilistic model, such as a Gaussian mixture model and density estimators. For learning the model, expectation maximization (EM) is used to estimate the mixture model's parameters, including using maximum likelihood estimation techniques, which seek to maximize the probability, or likelihood, of the observed data given the model parameters. Then the fitted model can be used to perform various forms of inference, in various embodiments. While the driver 2005 is driving, the real-time driving model will be compared with the pre-trained normal driving model, and a deviation score will be calculated for each of the estimates. The deviation scores include, but are not limited to, a heat change deviation score $\sigma_H$ from heat change deviation score generator 2401, an expression deviation score $\sigma_E$ from expression deviation score generator 2401, a gesture deviation score $\sigma_G$ from gesture deviation score generator 2403, an MFCC deviation score $\sigma_{MFCC}$ from MFCC deviation score generator 2404, an NLP deviation score $\sigma_{NLP}$ my from NLP deviation score generator 2405, vehicle OBD deviation scores (such as a vehicle speed deviation score $\sigma_{sp}$, a steering wheel deviation score $\sigma_{sw}$, a steering wheel error deviation score $\sigma_{swe}$, a time-to-lane-crossing deviation score $\sigma_{ttl}$, a time-to-collision deviation score $\sigma_{ttc}$, etc.) from OBD deviation score generator 2406, and a GPS deviation score $\sigma_{GPS}$ (which can be useful when comparing a vehicle's speed to the current location's speed limit, for instance) from GPS deviation score generator 2407. In various embodiments, these deviation scores will be inputs to a fusion layer 2500, the output of which is used by classifier 2600 to classify the driver state as normal driving behavior or road rage and distress driving behavior, in various embodiments.

Figure 5:
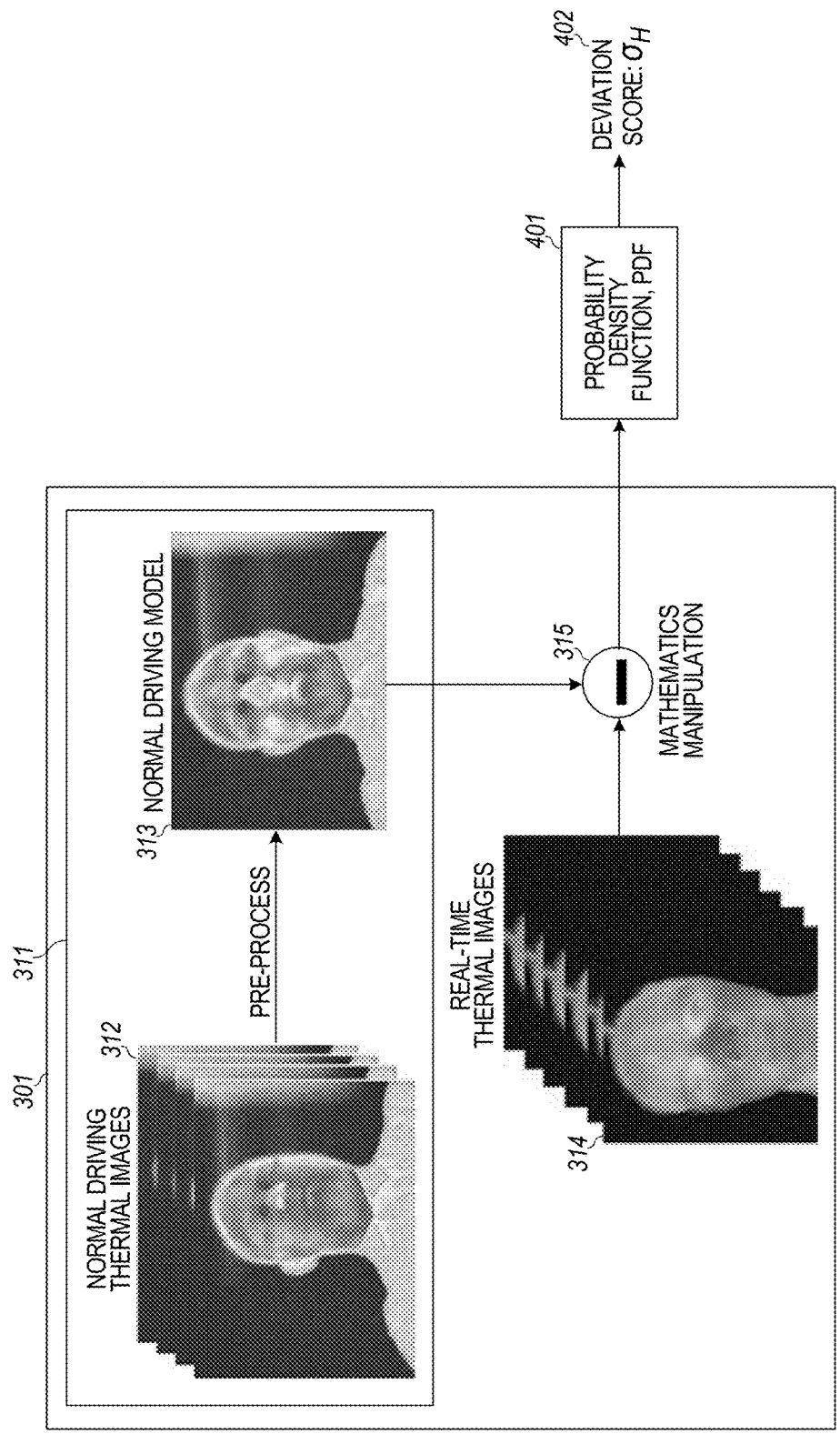
FIG. 5 is a block diagram illustrating calculation of a deviation score for a driver or passenger heat change estimate in a system for detection of driver and passenger distress, according to various embodiments.

For a Gaussian mixture model ($p(x_i)$) with M components:

$$N\left(x \mid \mu_i, \sum_i\right) = \frac{1}{\sqrt{(2\pi)^M |\sum_i|}} \exp\left[\frac{1}{2}(x - \mu_i)^T \sum_i^{-1} (x - \mu_i)\right]$$

$$p(x_i) = \sum_{i=1}^{M} a_i N_i\left(x_i \mid \mu_i, \sum_i\right)$$

where, $\alpha_i$ is the mixture component weights, $\mu_i$ is the component means, and $\Sigma_i$ is the component variances/co-variances FIG. 5 is a block diagram illustrating calculation of a deviation score for a driver or passenger heat change estimate in a system for detection of driver and passenger distress, according to various embodiments. To calculate the heat change deviation score 402, a normal driving model generator 311 collects normal driving thermal images 312 and pre-processes the images for a normal driving model 313. In various embodiments, the normal driving model 313 can be generated offline using a statistical analysis method, such as a Gaussian mixture model (GMM). In one embodiment, the pre-process uses a sequence of continuous image sensor frames from the normal driving model, and obtains the mean reading for each pixel. This mean is then compared with the real-time input of the image sensor to obtain a deviation score. In various embodiments, the normal driving model 313 is compared with real-time thermal images 314 using mathematic manipulation 315, such as subtraction. The comparison result output from comparison system 301 is an input to a heat change deviation score generator, which can use a probability density function (PDF) 401 to generate the heat change deviation score 402 $\sigma_H$. The heat change deviation score 402 $\sigma_H$ can be an input to the fusion layer 2500, as shown in FIG. 4.

The present disclosure also combines thermal imaging as part of the multimodal approach. A thermal imaging sensor can be used in order to understand the stress state and the emotional state of a driver, as the skin's temperature changes based on the activity being performed, and also changes based on the emotional state of a person. However, because the skin's temperature can change not only due to stress, but also based on other factors, such as physical activity, the present subject matter uses additional modalities to determine the stress level of a driver or passenger. Thus, the temperature of the driver's hands is also taken into account, since hand temperature is also a good indicator of emotions and distress states. The present system's multimodal approach makes use of activity recognition, voice recognition, and all the other aforementioned modalities. Combining all these modalities alongside the thermal signature of both the driver's face and hands produces a more generic and more robust model resistant to false positives.

Figure 6A:
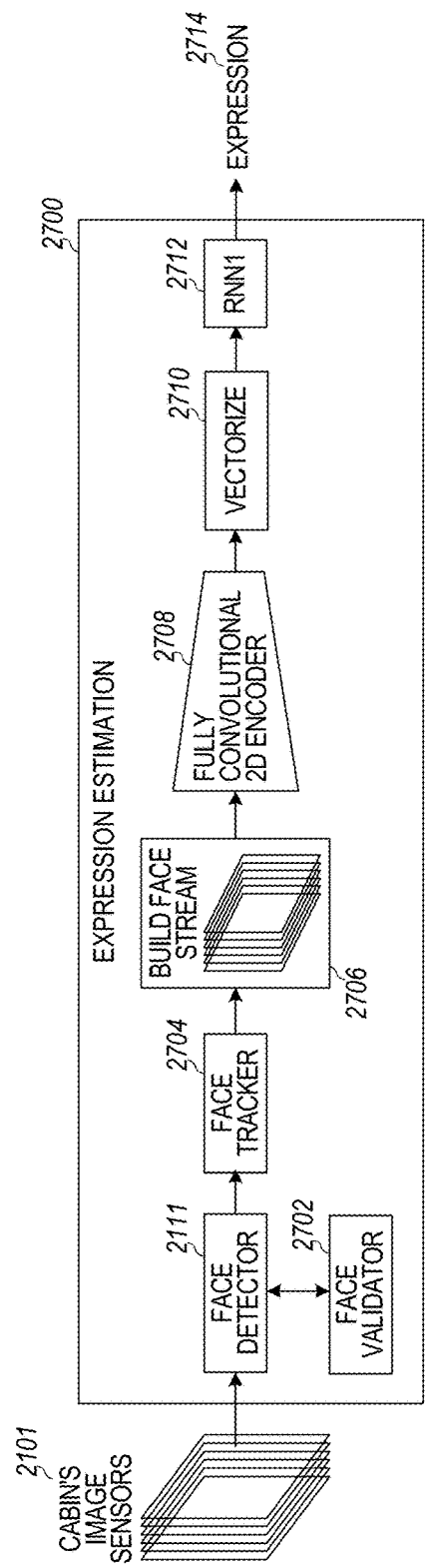
FIGS. 6A-6B are block diagrams illustrating detection of driver or passenger expression and calculation of a deviation score for a driver or passenger expression estimation, according to various embodiments.
Figure 6B:
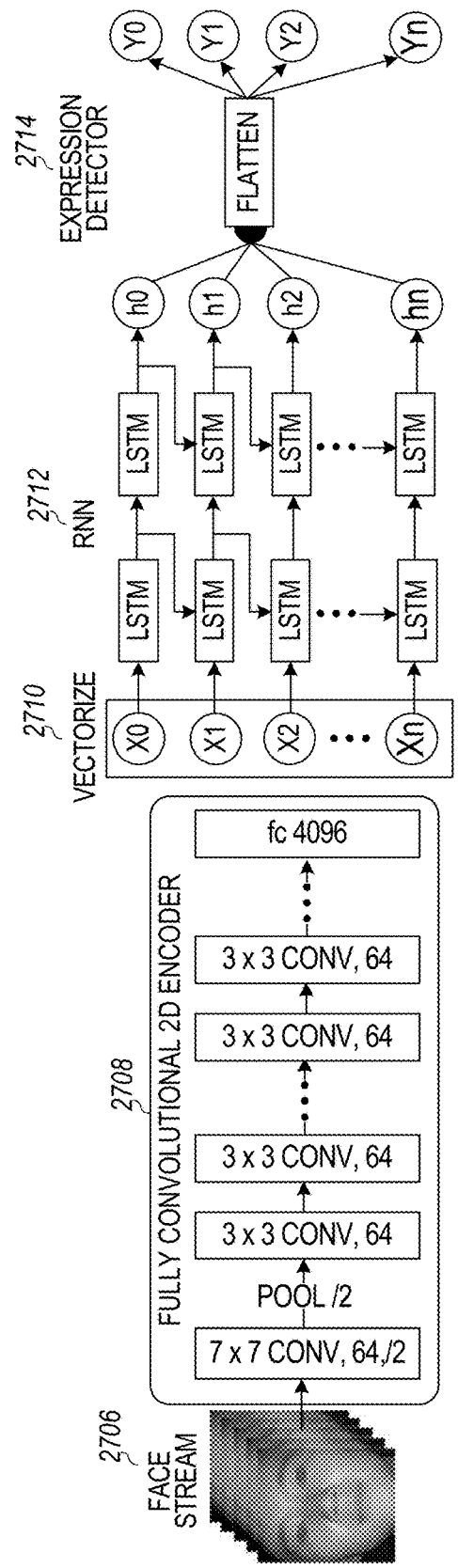

FIGS. 6A-6B are block diagrams illustrating detection of driver or passenger expression and calculation of a deviation score for a driver or passenger expression estimation 2700, according to various embodiments. To calculate the expression deviation score 2402 $\sigma_E$, the system receives an input from the cabin image sensors 2101, and uses the face detector 2111, a face validator 2702, and a face tracker 2704 to build a face stream 2706. The system uses a real-time human face detection and tracking technique called detection-tracking-validation (DTV), in various embodiments. The offline trained face detector 2111 localizes frontal faces, and the online trained face validator 2702 decides whether the tracked face corresponds to the driver. Using each image, a face stream 2706 frame is constructed from the partitioned face/eye regions, and normalized for size adjustment, in various embodiments. A two-dimensional (2D) fully convolutional network (FCN) 2708 with multiple convolutional, pooling, batch normalization, and rectified linear unit (ReLU) layers is applied. In various embodiments, the feature map of the last layer of the encoder is reshaped into vector form 2710, and the output is applied to a recurrent neural network (RNN), such as RNN1 2712, such as a long-short term memory (LSTM). This network is trained offline using back-propagation with facial expression data, in various embodiments. A normal driving expression model is pre-trained using a Gaussian mixture model (GMM), in various embodiments. While the driver is driving, the real-time expression is compared with the normal driving model, using an expression detector 2714. The calculated expression deviation score is used as an input to the fusion layer 2500, as shown in FIG. 4.

Figure 7A:
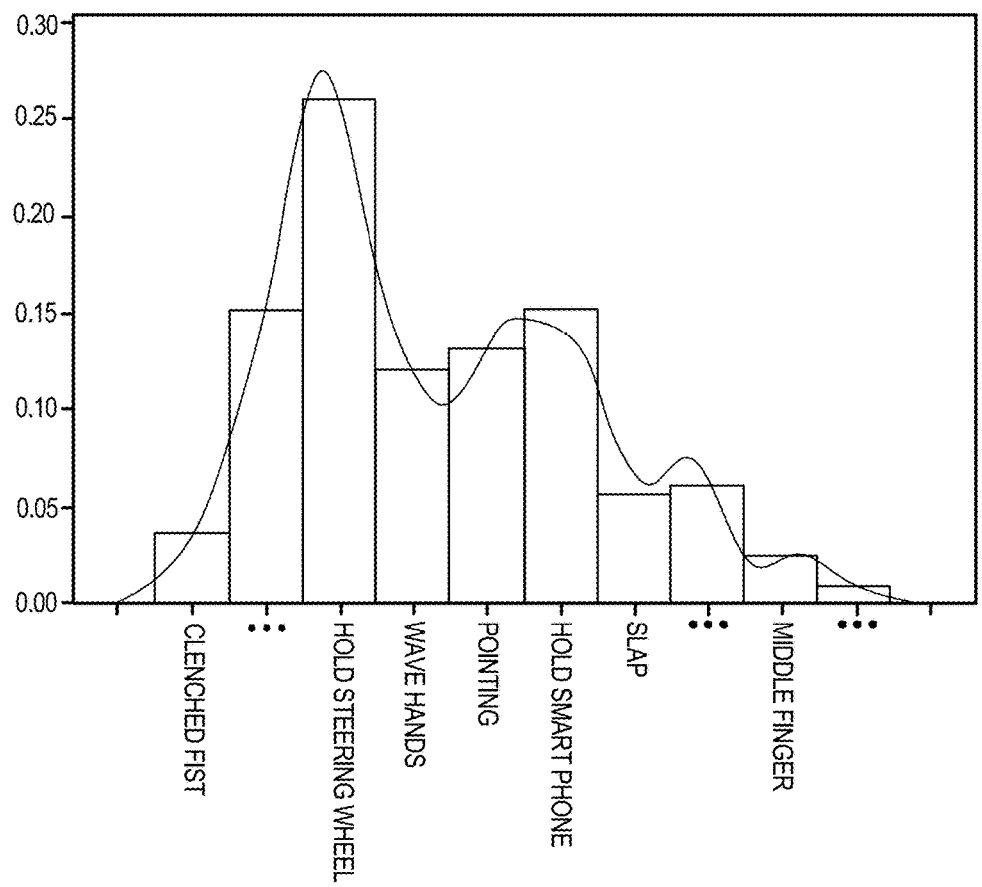
FIGS. 7A-7C are graphs illustrating calculation of a deviation score for a driver gesture estimate in a system for detection of driver and passenger distress, according to various embodiments.
Figure 7B:
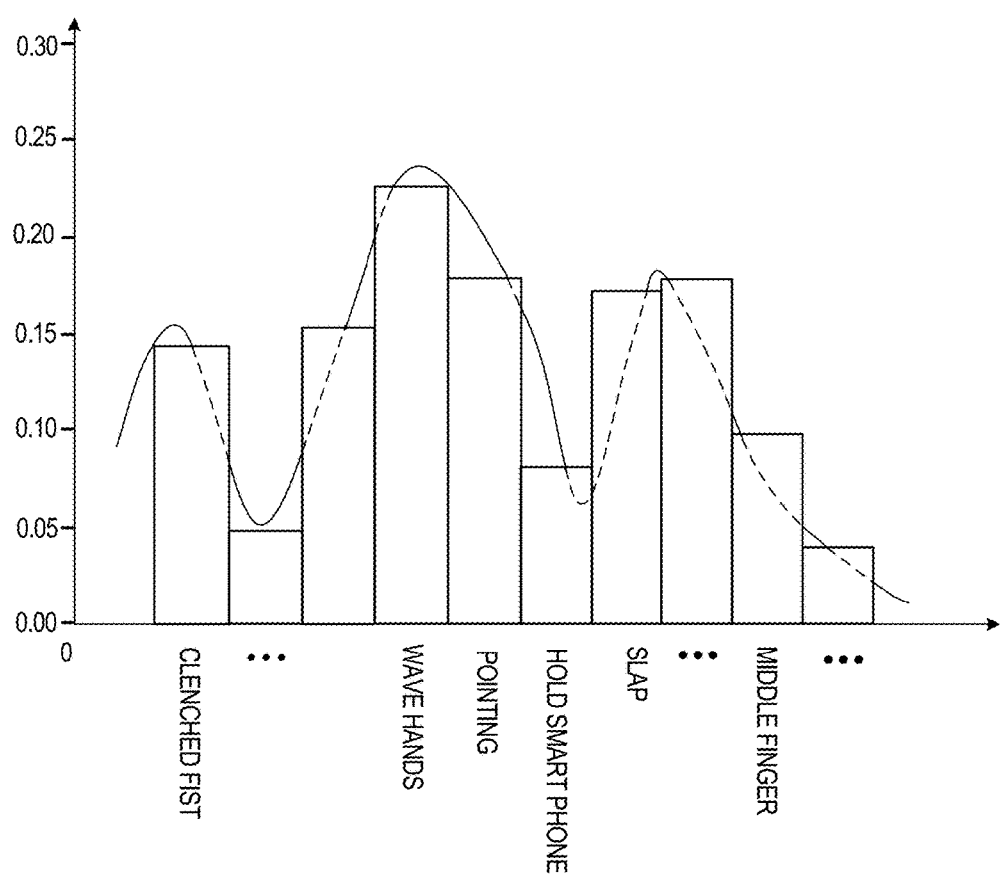
Figure 7C:
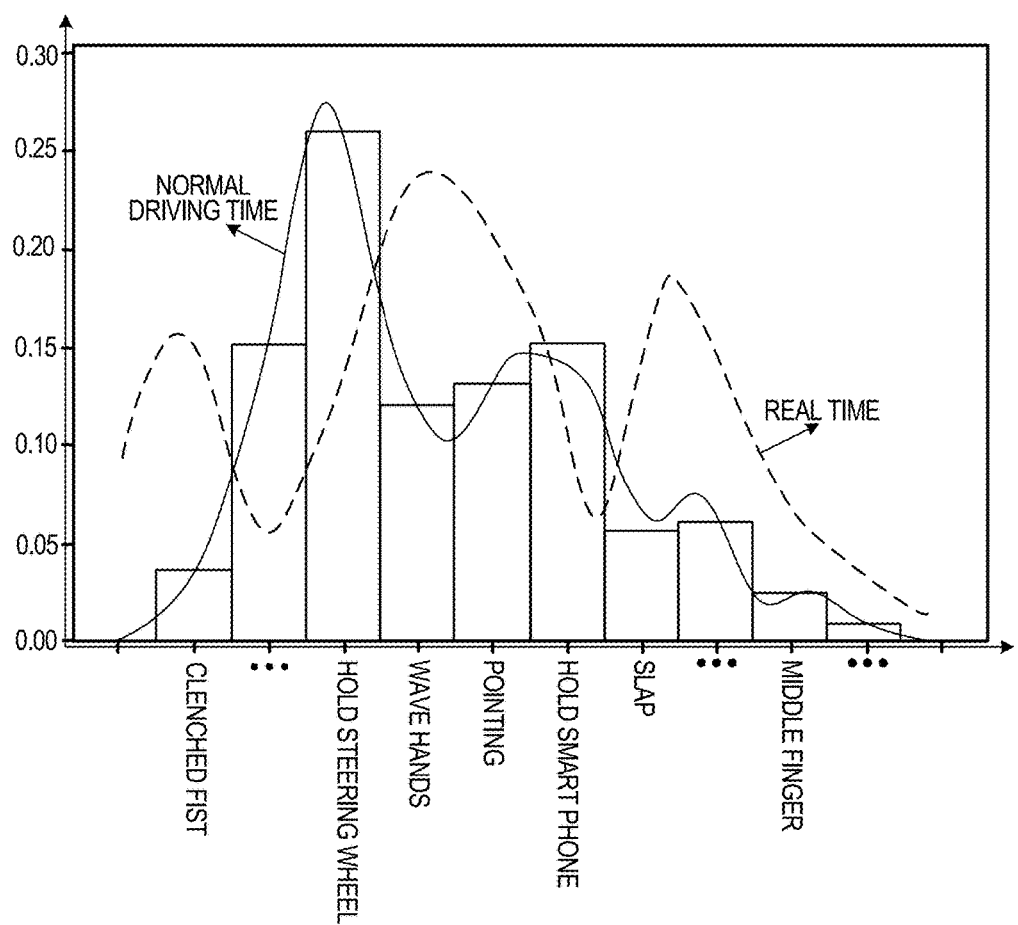

FIGS. 7A-7C are graphs illustrating calculation of a deviation score for a driver gesture estimate in a system for detection of driver and passenger distress, according to various embodiments. To calculate the gesture deviation score 2403 $\sigma_G$, the system first detects driver gestures, such a clenched fist, holding the steering wheel, waving hands, pointing at something, holding a smart phone, slapping, or a middle finger. The gesture detector 2203 of FIG. 4 receives an image, hand regions are partitioned, and a two-layer hand stream is constructed, in various embodiments. The hand stream is normalized for size adjustment, and a 2D FCN with multiple convolutional, pooling, batch normalization, and ReLU layers is applied, in various embodiments. The feature map of the last layer of the encoder is reshaped into vector form, and applied to the RNN, in various embodiments. In various embodiments, the network is trained offline using back-propagation with gesture data. A normal driving gesture model is pre-trained, and during driving, real-time gestures (shown in FIG. 7B) are compared with the normal driving gesture model, as shown in FIG. 7C, to obtain the gesture deviation score 2403 which is used as an input to the fusion layer 2500. FIG. 7A demonstrates the distribution of gestures detected inside a vehicle. The middle of the graph (the mean or expected gesture) indicates what is considered normal.

Figure 8:
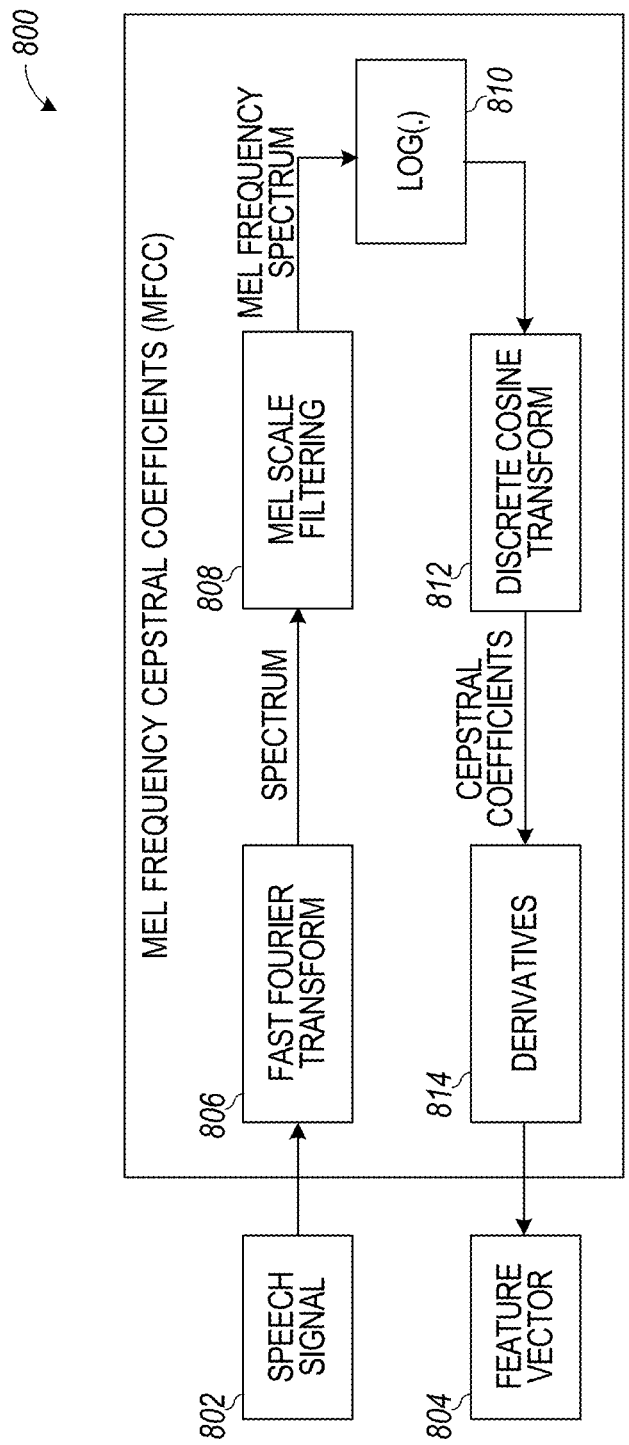
FIG. 8 is a flow diagram illustrating calculation of a deviation score for mel-frequency cepstral coefficients (MFCC), according to various embodiments.

FIG. 8 is a flow diagram illustrating calculation of a deviation score for mel-frequency cepstral coefficients (MFCC), according to various embodiments. A time domain audio signal is processed by a sampling step, windowing, and a de-noising step to obtain a speech signal 802, and then calculate the MFCC. An MFCC calculator 800 incorporates a fast Fourier transform (FFT) 806, mel scale filtering 808, a logarithmic function 810, a discrete cosine transform 812, and derivatives 814 to obtain a feature vector 804. In various embodiments, a normal driving MFCC model will be pre-trained using GMM or density estimators. During driving, the MFCC will be compared with the normal driving MFCC model to generate the MFCC deviation score 2404 $\sigma_{MFCC}$ as one of the inputs to the fusion layer 2500.

In various embodiments, the system uses natural language processing (NLP) to detect cursing and abusing words. A normal driving NLP model will be pre-trained using GMM and density estimators, in various embodiments. During driving, the driver's words will be compared with the normal driving NLP model, and the NLP deviation score 2405 $\sigma_{NLP}$ will be calculated as one of the inputs to the fusion layer 2500.

In addition, driving performance measurements can be used to generate OBD deviation scores, which include, but are not limited to, vehicle speed, steering wheel angle, steering wheel angle error, time to lane crossing, and time to collision. A multi-channel deviation score generator can be used for OBD data, in an embodiment. According to various embodiments, normal driving OBD data is collected and used to generate measurements, including pre-training a normal driving model to compare with real-time data. Each of the multiple channels is used to calculate a deviation score such as a vehicle speed deviation score $\sigma_{sp}$, a steering wheel deviation score $\sigma_{sw}$, a steering wheel error deviation score $\sigma_{Swe}$, a time-to-lane-crossing deviation score $\sigma_{ul}$, a time-to-collision deviation score $\sigma_{ttc}$, etc. In various embodiments, the deviation scores will be inputs to the fusion layer 2500.

According to various embodiments, the present system uses GPS data since a vehicle's location at a given time can offer useful information regarding a driver's distress and road rage level. Traffic information (such as speed limit, lane direction, no parking zones, location, etc.) is obtained and compared with the vehicle data to compute an initial traffic violation indicator. In conjunction with GPS data, the system could also use outside-facing sensors (e.g., SONAR, image sensors, LIDAR, etc.) to detect driving environment factors such as the vehicle's distance to nearby objects, the location of road lane markers, or traffic signs, as additional sources of information.

In various embodiments, each modality processing module outputs a deviation score as an input to the fusion layer 2500. The deviation score indicates the amount of deviation from normal for the modality output. In the case of a statistical distribution, the deviation score can include the dispersion from a standard or average measurement (i.e., how different the current measurements are from what is considered normal). For example, if a passenger is screaming, then the deviation scores for the current measurements of the noise modalities are going to be high.

As shown in FIG. 4, the cabin image sensors 2101 can include at least one cabin-facing image sensor, such as an NIR camera, a thermal IR camera, and/or a smartphone camera. The image sensors are used to extract visual features that help the system determine if there is road rage and distress for the driver. Some of these visual features may include, but are not limited to, thermal features such as changes in the driver's face temperature and changes in the driver's hand temperature. In various embodiments, temperature measurements can come from instantaneous changes in temperature (e.g., temperature at a specific time), or they may also be tracked over time (e.g., temperature change over an hour of measurement). The present system is capable of observing the changes in temperature over time. Changes in temperature over time can help the system determine, in combination with other features, if distress is building over time. For example, if the temperature is increasing over time inside the vehicle's cabin then the driver's temperature may also increase. This increase can be measured by the camera and then be used as an indication of future distress.

According to various embodiments, the present system also uses the image sensors in order to understand other visual cues, which may include, but are not limited to, facial expressions, as well as hand gestures and activities inside the cabin. For example, the image sensors, after detecting the hands and face of the driver, sense images in which the driver is waving his/her fist, while at the same time the face and hand temperatures are rising, while at the same time the mouth of the driver is wide open (e.g., screaming). These circumstances can be understood as potential indications of distress and road rage in the driver.

Figure 9A:
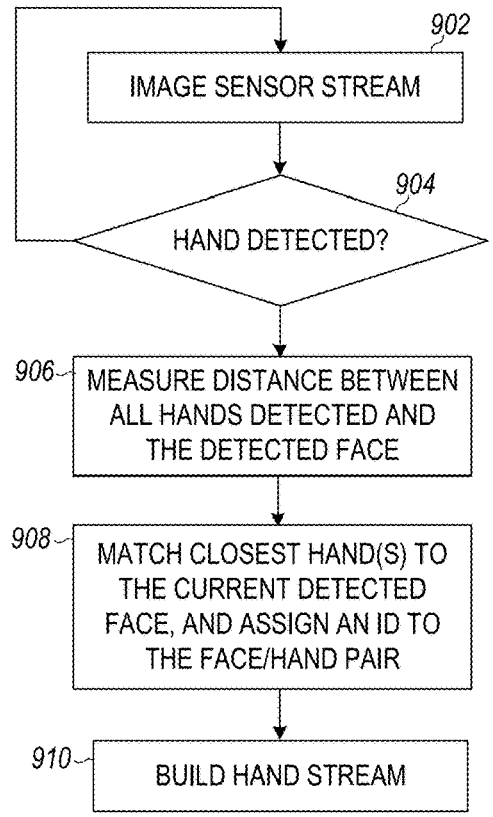
FIGS. 9A-9B are flow diagrams illustrating methods for associating hands and a face with a driver using an image sensor stream, according to various embodiments.
Figure 9B:
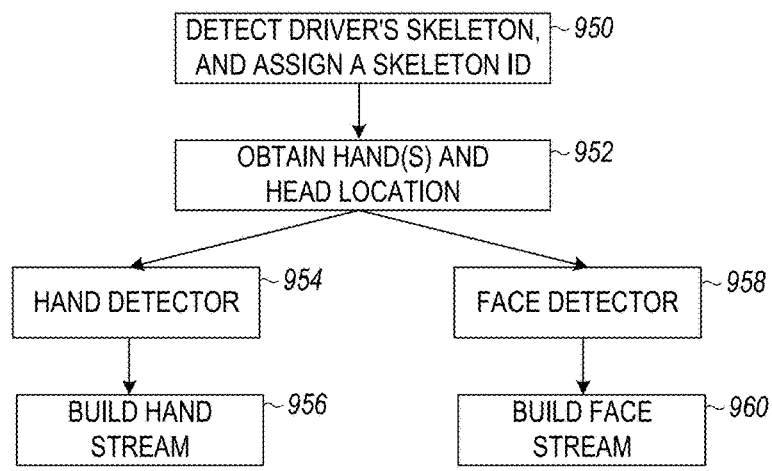

FIGS. 9A-9B are flow diagrams illustrating methods for associating hands and a face with a driver using an image sensor stream, according to various embodiments. When the present system detects multiple people inside a vehicle's cabin, the system learns to match specific hands to specific faces, so the system knows which hands and which face to track. FIG. 9A illustrates an embodiment to match hands and faces from an image sensor stream 902. The depicted method includes algorithms to detect hands at 904, measure distance between all hands detected and the detected face close to a detected face at 906, match the closest hand(s) to the current detected face and assign an identification tag (ID) to the face/hand pair at 908, and to use that information to build a hand stream at 910. FIG. 9B illustrates another embodiment, where a driver's skeleton is detected and assigned an identification tag (operation 950), which is used to obtain the positions of face and hands relative to the skeleton in three-dimensional space (operation 952). The embodiment proceeds with using a hand detector 954 to build a hand stream 956 and a face detector 958 to build a face stream 960, to associate each hand and face with the people inside the vehicle.

The present subject matter uses machine learning methods to further refine the procedure by adapting to activities between the driver and passengers. For example, the system can learn that not only external drivers in the environment may cause distress and road rage, but also a combination of environmental factors inside the cabin (e.g., kids screaming) The image sensors can also be used in order to detect hand gestures such as cursing gestures, and other gestures which may have different meanings (e.g., country/culture-dependent gestures). The system uses stored data to predict if the distress and road rage is happening, or if it may happen in the near future. Image sensors embedded in vehicles are becoming common, and some vehicles on the market already include not only external image sensors, but also internal image sensors that can capture the entire vehicle's cabin.

Figure 10A:
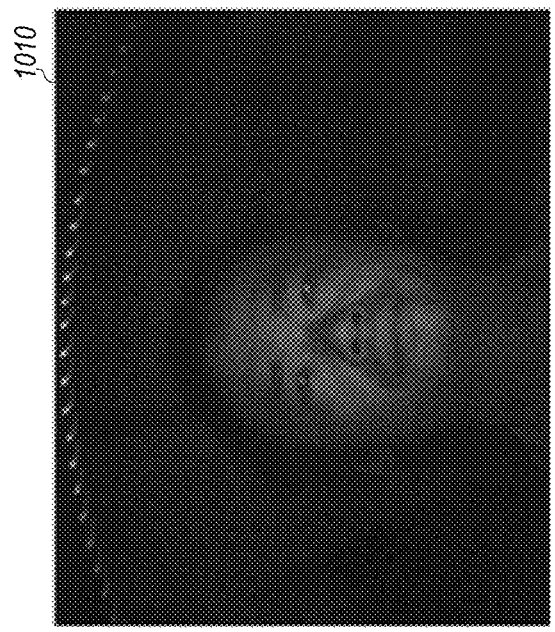
FIGS. 10A-10B illustrate an image sensor of the present subject matter and an example of a captured image from the sensor, according to various embodiments.
Figure 10B:
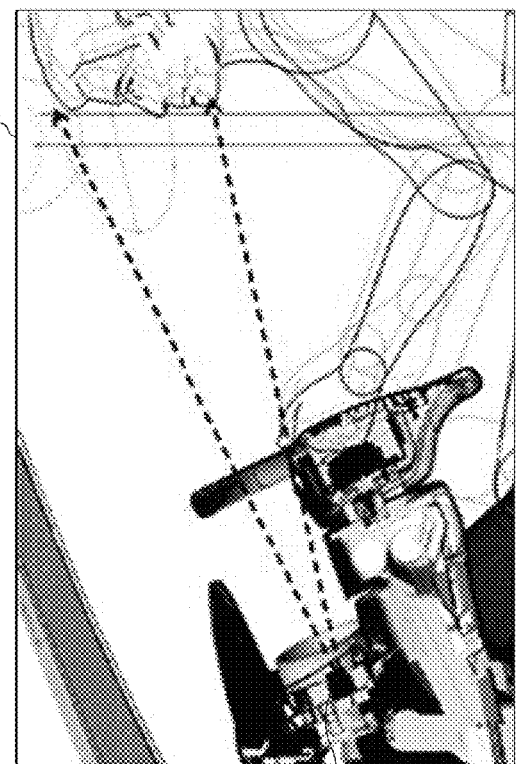

FIGS. 10A-10B illustrate an image sensor of the present subject matter and an example of a captured image from the sensor, according to various embodiments. The image sensor may include an NIR camera 1001 mounted on or inside the dashboard and directed toward the face of a driver 1002, to produce an image 1010 of the driver's face for further processing.

Figure 11:
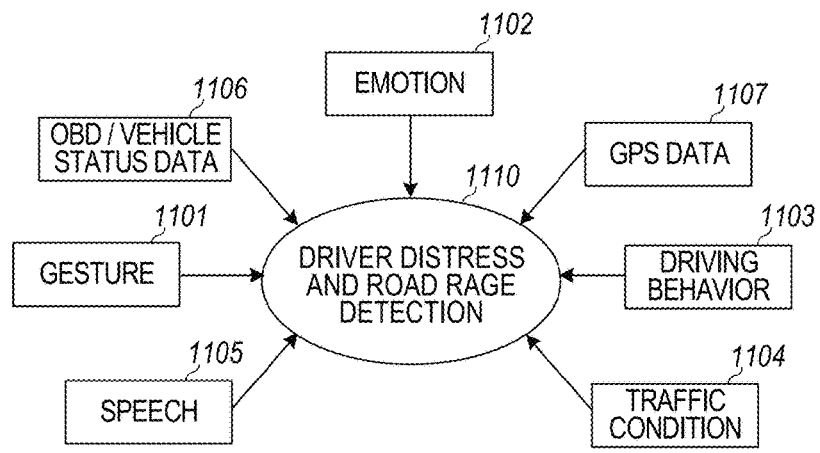
FIG. 11 is a flow diagram illustrating a method for detection of driver and passenger distress, according to various embodiments.

FIG. 11 is a flow diagram illustrating a method for detection of driver and passenger distress, according to various embodiments. The depicted embodiment shows the multimodal approach of the present subject matter, which gathers information from several sources, including but not limited to gesture inputs 1101, emotion inputs 1102, driving behavior inputs 1103, traffic condition inputs 1104, speech inputs 1105, OBD/vehicle status data 1106, and GPS data 1107, to detect driver distress and road rage 1110.

Alternative embodiments for this system may also include biosignal sensors that can be attached to the steering wheel, and other points of contact in a vehicle. For instance, the transmission clutch for a vehicle may have sensors embedded in the fabric that can measure heartbeats and hand temperature. Also, these biosignal sensors can be embedded in other parts of the vehicle, such as the radio buttons and the control panel buttons. During driving, the steering wheel is one of the most-touched parts of the vehicle, so the steering wheel can include one or more biosignal sensors to help better understand the current status of a driver, in various embodiments. Moreover, the data gathered from these touch sensors embedded in the vehicle's fabric and equipment can be obtained from the OBD port located inside the vehicle, in an embodiment. Further embodiments may include using a radar, capacitive, or inductive sensor attached to or within a seat of the vehicle, and configured to sense a heartbeat of the occupant. These seat sensors can function in a touchless manner, in an embodiment. Alternative embodiments may also include using the image sensors inside a vehicle in order to perform remote photoplethysmography (rPPG). Remote photoplethysmography is a technique that uses an image sensor that detects changes that occur to the skin, for example, due to changes in blood pressure as a direct consequence of changes in the heartbeat rate. The fact that this is a touchless technology means that the same image sensor that is used for detecting facial expressions and activity recognition can also be used in order to perform photoplethysmography. The image sensor choice could be an RGB imaging sensor, or a near-infrared imaging sensor, in various embodiments. The additional information provided by rPPG can also be combined with the information obtained from a thermal camera. Using machine learning algorithms, the system can further learn to identify changes in the driver's skin that are related to stress levels and also to road rage. Moreover, besides techniques such as rPPG, other methods can be used to detect changes in blood flow in a driver's face, including the use of the Eulerian video magnification method in order to amplify subtle changes in a person's face. This can further help the machine learning algorithm to track the changes over time, and predict if the driver will present distress and be prone to road rage.

Figure 12:
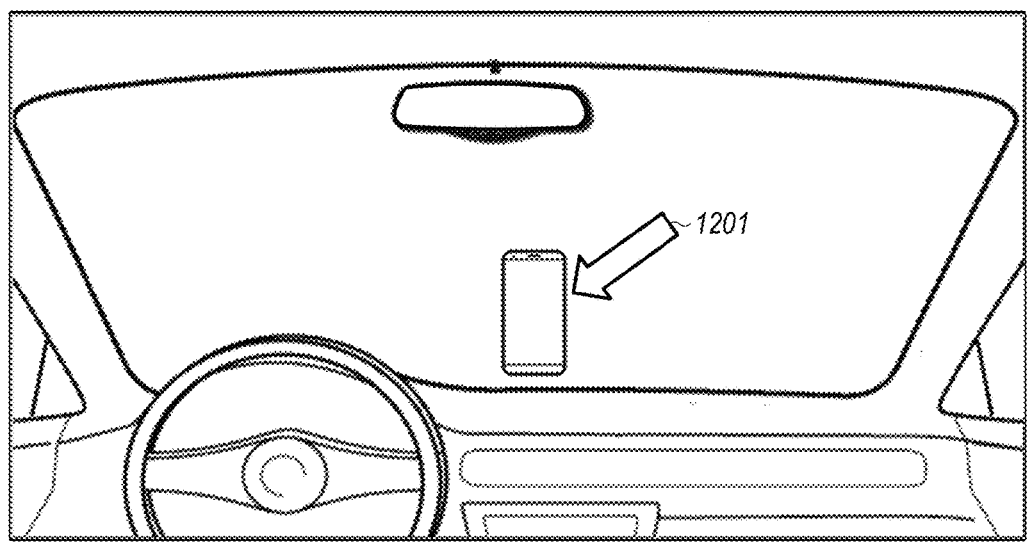
FIG. 12 illustrates a system for detection of driver and passenger distress, according to various embodiments.

FIG. 12 illustrates a system for detection of driver and passenger distress, according to various embodiments. In the depicted embodiment, a mobile phone 1201 is mounted to the windshield as part of the system. Unlike previous applications, however, the present subject matter uses a number of sensors outside of the mobile phone 1201 for inputs, therefore is not limited to onboard sensors of the mobile phone 1201. In addition, the present subject matter can use the processor in the mobile phone 1201 as the main computational device, or can use an embedded processor in the vehicle's computational unit, a designated unit, or a combination of these.

Figure 13:
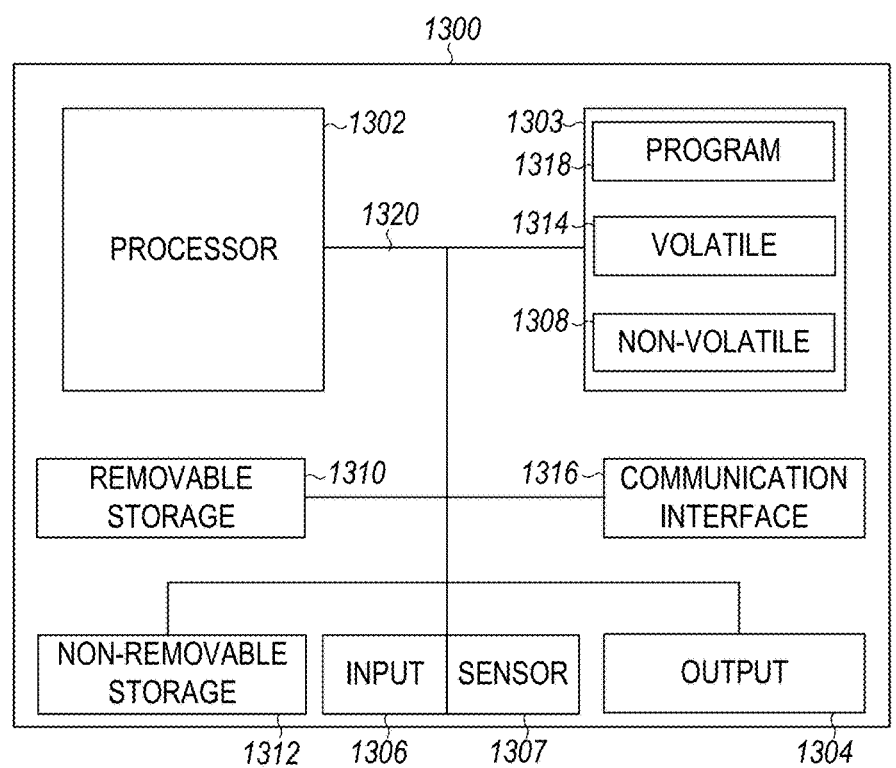
FIG. 13 is a diagram illustrating circuitry for implementing devices to perform methods according to an example embodiment.

FIG. 13 is a schematic diagram illustrating circuitry for implementing devices to perform methods according to example embodiments. Not all components need be used in various embodiments. For example, the computing devices may each use a different set of components and storage devices.

One example computing device in the form of a computer 1300 may include a processing unit 1302, memory 1303, removable storage 1310, and non-removable storage 1312. Although the example computing device is illustrated and described as the computer 1300, the computing device may be in different forms in different embodiments. For example, the computing device may instead be a smartphone, a tablet, a smartwatch, or another computing device including elements the same as or similar to those illustrated and described with regard to FIG. 13. Devices such as smartphones, tablets, and smartwatches are generally collectively referred to as "mobile devices." Further, although the various data storage elements are illustrated as part of the computer 1300, the storage may also or alternatively include cloud-based storage accessible via a network, such as the Internet, or server-based storage. According to one embodiment, the various components of computer 1300 are connected with a system bus 1320.

The memory 1303 may include volatile memory 1314 and/or non-volatile memory 1308. The computer 1300 may include—or have access to a computing environment that includes—a variety of computer-readable media, such as the volatile memory 1314 and/or the non-volatile memory 1308, the removable storage 1310, and/or the non-removable storage 1312. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 1300 may include or have access to a computing environment that includes an input device 1306, an output device 1304, and a communication interface 1316. In various embodiments, the communication interface 1316 includes a transceiver and an antenna. The output device 1304 may include a display device, such as a touchscreen, that also may serve as an input device. The input device 1306 may include one or more of a touchscreen, a touchpad, a mouse, a keyboard, a camera, one or more device-specific buttons, and other input devices. Various embodiments include one or more sensors 1307 integrated within or coupled via wired or wireless data connections to the computer 1300. The computer 1300 may operate in a networked environment using a communication connection to connect to one or more remote computers, such as database servers. The remote computer may include a personal computer (PC), server, router, network PC, peer device or other common network node, or the like. The communication connection may include a Local Area Network (LAN), a Wide Area Network (WAN), a cellular network, a WiFi network, a Bluetooth network, or other networks.

Computer-readable instructions, e.g., a program 1318, comprise instructions stored on a computer-readable medium that are executable by the processing unit 1302 of the computer 1300. A hard drive, CD-ROM, or RAM are some examples of articles including a non-transitory computer-readable medium, such as a storage device. The terms "computer-readable medium" and "storage device" do not include carrier waves to the extent that carrier waves are deemed too transitory. Storage can also include networked storage such as a storage area network (SAN).

Figure 14:
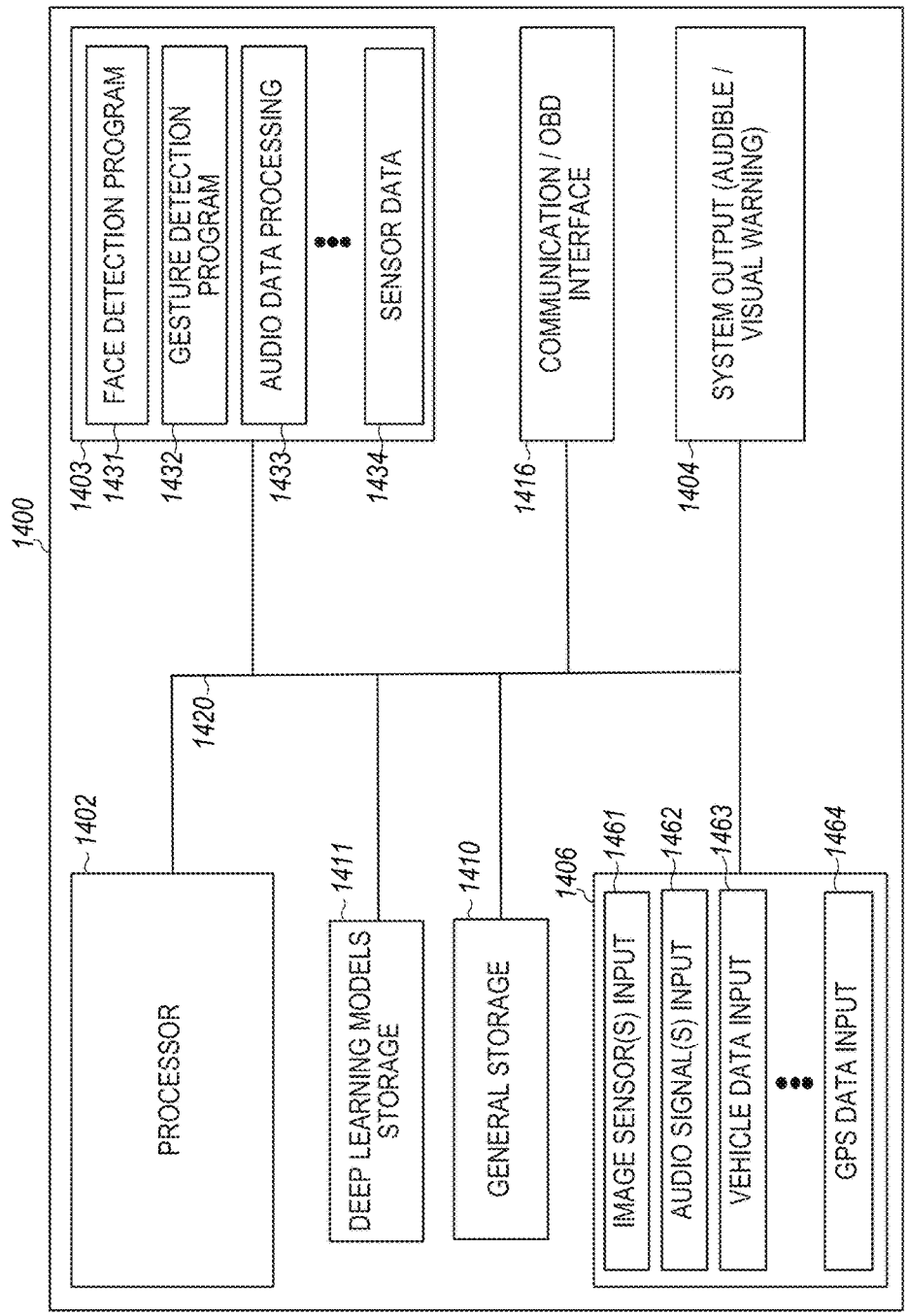
FIG. 14 is a schematic diagram illustrating circuitry for implementing devices to perform methods according to example embodiments.

FIG. 14 is a schematic diagram illustrating circuitry for implementing devices to perform methods according to example embodiments. One example computing device in the form of a computer 1400 may include a processing unit 1402, memory 1403 where programs run, a general storage component 1410, and deep learning model storage 1411. Although the example computing device is illustrated and described as computer 1400, the computing device may be in different forms in different embodiments. For example, the computing device may instead be a smartphone, a tablet, a smartwatch, an embedded platform, or other computing device including the same or similar elements as illustrated and described with regard to FIG. 14. According to one embodiment, the various components of computer 1400 are connected with a system bus 1420.

Memory 1403 may include storage for programs including, but not limited to, face detection program 1431, and gesture detection program 1432, as well as storage for audio data processing 1433, and sensor data 1434. Computer 1400 may include or have access to a computing environment that includes inputs 1406, system output 1404, and a communication interface 1416. In various embodiments, communication interface 1416 includes a transceiver and an antenna as well ports, such as OBD ports. System output 1404 may include a display device, such as a touchscreen, that also may serve as an input device. The system output 1404 may provide an audible or visual warning, in various embodiments. The inputs 1406 may include one or more of a touchscreen, touchpad, mouse, keyboard, camera, microphone, one or more device-specific buttons, and/or one or more sensor inputs such as image sensor input 1461, audio signal input 1462, vehicle data input 1463, and GPS data input 1464. Additional inputs may be used without departing from the scope of the present subject matter. Computer-readable instructions, i.e., a program such as a face detection program 1403, comprise instructions stored on a computer-readable medium that are executable by the processing unit 1402 of the computer 1400.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude, or suggest that a combination of these measures cannot be used. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

Although a few embodiments have been described in detail above, other modifications are possible. For example, the logic flows depicted in the figures do not require the particular order shown, or sequential order, to achieve desirable results. Other steps may be provided in, or steps may be eliminated from, the described flows, and other components may be added to, or removed from, the described systems. Other embodiments may be within the scope of the following claims.

What is claimed is:

1. A method for to determine distress of a driver of a vehicle, the method comprising:
   receiving inputs by one or more processors from a plurality of sensors, including interior vehicle image sensors, an interior vehicle audio sensor, vehicle data sensors, and Global Positioning System (GPS) data sensors;
   processing the received inputs by the one or more processors to obtain a driver heat change estimate, a driver expression estimate, a driver gesture estimate, an on-board diagnostics (OBD) estimate, and a GPS estimate;
   storing by the one or more processors the estimates in a memory;
   using the stored estimates by the one or more processors to generate deviation scores for each of the driver heat change estimate, the driver expression estimate, the driver gesture estimate, the OBD estimate, and the GPS estimate, wherein generating the deviation score for the driver heat change estimate includes:
   generating a normal driving model offline using normal driving thermal images of the driver;
   comparing the normal driving model with real-time thermal image data of the driver to obtain a comparison result; and
   applying a probability density function (PDF) to the comparison result to obtain the deviation score for the driver heat change estimate;
   executing a machine learning algorithm by the one or more processors to classify driver behavior as normal or impaired based on the deviation scores; and
   generating a warning by the one or more processors based on the classification indicating impaired driver behavior.

2. The method of claim 1, wherein generating the deviation score for the driver expression estimate includes:
   using detection-tracking-validation (DTV) to localize frontal face images of the driver;
   constructing a face stream frame from a partitioned face region of the frontal face images;
   applying a fully convolutional network (FCN) to the face stream frame using an encoder, including using multiple convolutional, pooling, batch normalization, and rectified linear unit (ReLU) layers;
   reshaping a feature map of a last layer of the encoder into vector form to obtain an output, and applying the output to a recurrent neural network (RNN) to obtain a normal driving expression model using a Gaussian mixture model (GMM); and
   comparing a real-time driver or passenger expression with the normal driving expression model to calculate the deviation score for the driver expression estimate.

3. The method of claim 1, wherein generating the deviation score for the driver gesture estimate includes:
   detecting driver gestures to obtain an image of a hands region of the driver;
   constructing a two-layer hand stream from the image and normalizing the two-layer hand stream for size adjustment;
   applying a fully convolutional network (FCN) to the two-layer hand stream using an encoder, including using multiple convolutional, pooling, batch normalization, and rectified linear unit (ReLU) layers;
   reshaping a feature map of a last layer of the encoder into vector form to obtain an output, and applying the output to a recurrent neural network (RNN) to obtain a normal driving gesture model using a Gaussian mixture model (GMM); and
   comparing a real-time driver gesture with the normal driving gesture model to calculate the deviation score for the driver gesture estimate.

4. The method of claim 1, wherein generating the deviation score for the OBD estimate includes:
   collecting normal driving data from OBD related to two or more of vehicle speed, steering wheel angle, steering wheel angle error, time to lane crossing, and time to collision;
   using the normal driving data to generate a normal driving model for each of the two or more of vehicle speed, steering wheel angle, steering wheel angle error, time to lane crossing, and time to collision; and
   comparing real-time data to the normal driving model for each of the two or more of vehicle speed, steering wheel angle, steering wheel angle error, time to lane crossing, and time to collision to generate a deviation score for each of the two or more of vehicle speed, steering wheel angle, steering wheel angle error, time to lane crossing, and time to collision.

5. The method of claim 1, wherein the warning includes a visual alert.

6. The method of claim 1, wherein the warning includes an audio output.

7. The method of claim 1, wherein the warning includes a suggested corrective driver action using a display.

8. The method of claim 1, wherein using the processor to execute the machine learning algorithm to classify the driver behavior as normal or impaired includes using a Gaussian mixture model (GMM).

9. The method of claim 8, wherein expectation maximization is used to estimate model parameters of the GMM.

10. The method of claim 1, wherein the processor is configured to generate a normal driving model offline for comparison to real-time driving data.

11. A system for determining distress of a driver of a vehicle, the system comprising:
a plurality of sensors, including interior vehicle image sensors, an interior vehicle audio sensor, vehicle data sensors, and Global Positioning System (GPS) data sensors; and
one or more processors in communication with the plurality of sensors, the one or more processors configured to:
receive inputs from the plurality of sensors;
process the received inputs to obtain a driver heat change estimate, a driver expression estimate, a driver gesture estimate, an on-board diagnostics (OBD) estimate, and a GPS estimate;
store the estimates in a memory;
use the stored estimates to generate deviation scores for each of the driver heat change estimate, the driver expression estimate, the driver gesture estimate, the OBD estimate, and the GPS estimate, wherein generating the deviation score for the driver expression estimate includes:
using detection-tracking-validation (DTV) to localize frontal face images of the driver;
constructing a face stream frame from a partitioned face region of the frontal face images;
applying a fully convolutional network (FCN) to the face stream frame using an encoder, including using multiple convolutional, pooling, batch normalization, and rectified linear unit (ReLU) layers;
reshaping a feature map of a last layer of the encoder into vector form to obtain an output, and applying the output to a recurrent neural network (RNN) to obtain a normal driving expression model using a Gaussian mixture model (GMM); and
comparing a real-time driver or passenger expression with the normal driving expression model to calculate the deviation score for the driver expression estimate;
execute a machine learning algorithm to classify driver behavior as normal or impaired based on the deviation scores; and
generate a warning based on the classification indicating impaired driver behavior.

12. The system of claim 11, wherein the plurality of sensors further includes exterior-facing sensors of the vehicle.

13. The system of claim 11, wherein the processor is further configured to receive a traffic information input, including at least one of a speed limit and a lane direction.

14. The system of claim 11, wherein the warning includes a suggested corrective driver action using a display.

15. A non-transitory computer-readable medium storing computer instructions to determine distress of a driver of a vehicle and provide a warning, that when executed by one or more processors, cause the one or more processors to perform steps of:
receiving inputs from a plurality of sensors, including interior vehicle image sensors, an interior vehicle audio sensor, vehicle data sensors, and Global Positioning System (GPS) data sensors;
processing the received inputs to obtain a driver heat change estimate, a driver expression estimate, a driver gesture estimate, an on-board diagnostics (OBD) estimate, and a GPS estimate;
storing the estimates in a memory;
using the stored estimates to generate deviation scores for each of the driver heat change estimate, the driver expression estimate, the driver gesture estimate, the OBD estimate, and the GPS estimate, wherein generating the deviation score for the driver gesture estimate includes:
detecting driver gestures to obtain an image of a hands region of the driver;
constructing a two-layer hand stream from the image and normalizing the two-layer hand stream for size adjustment;
applying a fully convolutional network (FCN) to the two-layer hand stream using an encoder, including using multiple convolutional, pooling, batch normalization, and rectified linear unit (ReLU) layers;
reshaping a feature map of a last layer of the encoder into vector form to obtain an output, and applying the output to a recurrent neural network (RNN) to obtain a normal driving gesture model using a Gaussian mixture model (GMM); and
comparing a real-time driver gesture with the normal driving gesture model to calculate the deviation score for the driver gesture estimate;
executing a machine learning algorithm to classify driver behavior as normal or impaired based on the deviation scores; and
generating the warning based on the classification indicating impaired driver behavior.

16. The computer-readable medium of claim 15, wherein generating the deviation score for the driver heat change estimate includes:
generating a normal driving model offline using normal driving thermal images of the driver;
comparing the normal driving model with real-time thermal image data of the driver to obtain a comparison result; and
applying a probability density function (PDF) to the comparison result to obtain the deviation score for the driver heat change estimate.

17. The computer-readable medium of claim 15, wherein generating the deviation score for the driver expression estimate includes:
using detection-tracking-validation (DTV) to localize frontal face images of the driver;
constructing a face stream frame from a partitioned face region of the frontal face images;
applying a fully convolutional network (FCN) to the face stream frame using an encoder, including using multiple convolutional, pooling, batch normalization, and rectified linear unit (ReLU) layers;

reshaping a feature map of a last layer of the encoder into vector form to obtain an output, and applying the output to a recurrent neural network (RNN) to obtain a normal driving expression model using a Gaussian mixture model (GMM); and comparing a real-time driver expression with the normal driving expression model to calculate the deviation score for the driver or passenger expression estimate.

18. The computer-readable medium of claim 15, wherein generating the deviation score for the OBD estimate includes:

collecting normal driving data from OBD related to two or more of vehicle speed, steering wheel angle, steering wheel angle error, time to lane crossing, and time to collision;

using the normal driving data to generate a normal driving model for each of the two or more of vehicle speed, steering wheel angle, steering wheel angle error, time to lane crossing, and time to collision; and comparing real-time data to the normal driving model for each of the two or more of vehicle speed, steering wheel angle, steering wheel angle error, time to lane crossing, and time to collision to generate a deviation score for each of the two or more of vehicle speed, steering wheel angle, steering wheel angle error, time to lane crossing, and time to collision.

19. A method for to determine distress of a driver of a vehicle, the method comprising:

receiving inputs by one or more processors from a plurality of sensors, including interior vehicle image sensors, an interior vehicle audio sensor, vehicle data sensors, and Global Positioning System (GPS) data sensors;

processing the received inputs by the one or more processors to obtain a driver heat change estimate, a driver expression estimate, a driver gesture estimate, an onboard diagnostics (OBD) estimate, and a GPS estimate;

storing by the one or more processors the estimates in a memory;

using the stored estimates by the one or more processors to generate deviation scores for each of the driver heat change estimate, the driver expression estimate, the driver gesture estimate, the OBD estimate, and the GPS estimate;

executing a machine learning algorithm by the one or more processors to classify driver behavior as normal or impaired based on the deviation scores using a Gaussian mixture model (GMM), wherein expectation maximization is used to estimate model parameters of the GMM; and generating a warning by the one or more processors based on the classification indicating impaired driver behavior.

* * * * *